United States Patent
Egi et al.

(10) Patent No.: US 8,868,222 B2
(45) Date of Patent: Oct. 21, 2014

(54) AUDIO QUALITY ESTIMATION METHOD, AUDIO QUALITY ESTIMATION APPARATUS, AND COMPUTER READABLE RECORDING MEDIUM RECORDING A PROGRAM

(75) Inventors: Noritsugu Egi, Tokyo (JP); Takanori Hayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 867 days.

(21) Appl. No.: 12/996,767

(22) PCT Filed: May 25, 2009

(86) PCT No.: PCT/JP2009/059529
§ 371 (c)(1), (2), (4) Date: Dec. 7, 2010

(87) PCT Pub. No.: WO2009/150932
PCT Pub. Date: Dec. 17, 2009

(65) Prior Publication Data
US 2011/0075852 A1    Mar. 31, 2011

(30) Foreign Application Priority Data
Jun. 11, 2008    (JP) .................. 2008-153089

(51) Int. Cl.
*G06F 17/00*    (2006.01)
*H04L 12/26*    (2006.01)
*H04L 29/06*    (2006.01)
*G10L 25/69*    (2013.01)
*H04R 29/00*    (2006.01)
*H04M 3/22*    (2006.01)

(52) U.S. Cl.
CPC .............. *G10L 25/69* (2013.01); *H04M 3/2236* (2013.01); *H04L 43/0835* (2013.01); *H04L 65/80* (2013.01)
USPC .................. 700/94; 704/E19.002; 381/58

(58) Field of Classification Search
USPC .................... 704/E19.002; 700/94
See application file for complete search history.

(56) References Cited

U.S. PATENT DOCUMENTS
2007/0053303 A1 *    3/2007    Kryuchkov ................... 370/250

FOREIGN PATENT DOCUMENTS
CN    1551588 A    3/2004
EP    1455505 A2    9/2004
(Continued)

OTHER PUBLICATIONS
ITUT P.564; "Series P: Telephone Transmission Quality, Telephone Installation, Local Line Networks", Jul. 2006, 29 pages.
(Continued)

*Primary Examiner* — Joseph Saunders, Jr.
(74) *Attorney, Agent, or Firm* — Blakely Sokoloff Taylor & Zafman

(57) ABSTRACT

An audio quality estimation apparatus includes an audio packet loss frequency calculation unit (11) which, when at least one audio packet to be assessed exists in singly or continuously generated IP packet losses, calculates an audio packet loss frequency based on information of received IP packets by counting the packet losses as an audio packet loss of one time regardless of the continuous length, an average influence time calculation unit (12) which calculates, based on information of received IP packets, an average influence time serving as an average time during which audio quality is influenced when the audio packet loss frequency is 1, and a subjective quality assessment value estimation unit (22) which estimates a subjective quality assessment value based on the audio packet loss frequency and average influence time.

36 Claims, 15 Drawing Sheets

(56) References Cited

FOREIGN PATENT DOCUMENTS

| EP | 1 924 101 A1 | 5/2008 |
|---|---|---|
| JP | 2005-244609 A | 9/2005 |
| WO | WO 2005/027852 A1 | 3/2005 |
| WO | WO 2005/046133 A1 | 5/2005 |

OTHER PUBLICATIONS

Hayashi et al., "State-of-the-Art of QoE Assessment Methodologies for Multimedia Telecommunication Services", IEICE Transactions on Fundamentals of Electronics, Communications and Computer Sciences, vol. J91-A, No. 6, pp. 600-612 (Jun. 1, 2008).

Egi et al., "QoE estimation method for interconnected VoIP networks employing different codecs", IEICE Technical Report, vol. 107, No. 230, pp. 159-164 (Sep. 20, 2007).

Yamagishi et al., "Total Quality Estimation Technique for Video Communication Services", NTT Gijutsu Journal, vol. 19, No. 3, pp. 74-77 (Mar. 1, 2007).

Akira Takahashi and Hideaki Yoshino, NTT Service Integration Laboratories Nobuhiko Kitawaki, University of Tsukuba, "Perceptual QoS Assessment Technologies for VoIP" IEEE Communications Magazine—Jul. 2004, pp. 28-34.

ITU International Telecommunication Union, ITU-T Telecommunication Standardization Sector of ITU, p.564 (Jul. 2006), "Series P: Telephone Transmission Quality, Telephone Installations, Local Line Networks" Objective measuring apparatus, "Conformance testing for narrowband voice over IP transmission quality assessment models", 27 pages.

Communication from the European Patent Office, Jun. 25, 2014, and European Search Report in connection with EP 09 76 2362 (09762362.3-1862/2288087 PCT/JP2009059529, Applicant Nippon Telegraph and Telephone Corporation, 6 pages.

* cited by examiner

AUDIO QUALITY ESTIMATION METHOD, AUDIO QUALITY ESTIMATION APPARATUS, AND COMPUTER READABLE RECORDING MEDIUM RECORDING A PROGRAM

This is a non-provisional application claiming the benefit of International application number PCT/JP2009/059529 filed May 25, 2009.

TECHNICAL FIELD

The present invention relates to a technique of estimating the subjective quality of audio data in streaming multimedia telecommunication services and, more particularly, to an audio quality design/management technique in multimedia telecommunication services.

BACKGROUND ART

When providing streaming multimedia telecommunication services, measuring audio quality experienced by a user while offering telecommunication services is indispensable for managing in-service quality and dealing with customer complaints. A method of most accurately measuring the QoE (Quality of Experience) is a subjective quality assessment method of assessing the QoE actually by a subject. However, this method cannot measure in-service quality. Thus, there is a demand for developing a technique of objectively measuring the QoE.

Objective quality assessment methods are classified into several categories. A parametric model is a model for estimating the QoE from inputted quality factors based on the relationship between the quality factors and the QoE. This model is suited to the service quality design. A parametric packet-layer model is a model for measuring, based on packet header information on the transmitting/receiving side, some of quality factors given as inputs of the parametric model. This model is suitable for measuring the in-service QoE. ITU-T (International Telecommunication Union Telecommunication Standardization Sector) recommendation P.564 defines a standard for a packet-layer model for a telephone-band or wideband telephone (see reference "Conformance testing for narrow-band voice over IP transmission quality assessment models", ITU-T Recommendation P.564, July 2006").

DISCLOSURE OF INVENTION

Problems to be Solved by the Invention

A conventional objective quality assessment method targets services in which the time length of data stored in one packet is fixed and a single medium is provided. However, in audio data utilized in multimedia telecommunication services, the amount (time length) of data stored in one packet is not constant owing to the encoding method, and packets sometimes contain a medium other than audio data. Hence, the conventional parametric packet-layer model cannot appropriately estimate audio quality. In this way, the conventional objective quality assessment method cannot estimate the subjective quality of audio data in multimedia telecommunication services.

The present invention has been made to solve the above-described problems, and has as its object to provide an audio quality estimation method, audio quality estimation apparatus, and program capable of appropriately estimating the subjective quality of audio data in multimedia telecommunication services.

Means of Solution to the Problems

According to the present invention, there is provided an audio quality estimation method for a multimedia telecommunication service which transmits a mixture of an audio packet serving as an IP packet containing audio data, and an IP packet containing no audio data, comprising the audio packet loss frequency calculation step of, when at least one audio packet to be assessed exists in singly or continuously generated IP packet losses, calculating an audio packet loss frequency based on information of received IP packets by counting the packet losses as an audio packet loss of one time regardless of a continuous length, the average influence time/average audio burst length calculation step of calculating, based on information of received IP packets, an average influence time serving as an average time during which audio quality is influenced when the audio packet loss frequency is 1, or an average audio burst length serving as an average number of audio packets contained in an audio packet loss of one time, and the subjective quality assessment value estimation step of estimating a subjective quality assessment value based on the audio packet loss frequency and one of the average influence time and the average audio burst length.

According to the present invention, there is provided an audio quality estimation apparatus comprising audio packet loss frequency calculation means for, when at least one audio packet to be assessed exists in singly or continuously generated IP packet losses, calculating an audio packet loss frequency based on information of received IP packets by counting the packet losses as an audio packet loss of one time regardless of a continuous length, average influence time/average audio burst length calculation means for calculating, based on information of received IP packets, an average influence time serving as an average time during which audio quality is influenced when the audio packet loss frequency is 1, or an average audio burst length serving as an average number of audio packets contained in an audio packet loss of one time, and subjective quality assessment value estimation means for estimating a subjective quality assessment value based on the audio packet loss frequency and one of the average influence time and the average audio burst length.

According to the present invention, there is provided an audio quality estimation program causing a computer to execute the audio packet loss frequency calculation step of, when at least one audio packet to be assessed exists in singly or continuously generated IP packet losses, calculating an audio packet loss frequency based on information of received IP packets by counting the packet losses as an audio packet loss of one time regardless of a continuous length, the average influence time/average audio burst length calculation step of calculating, based on information of received IP packets, an average influence time serving as an average time during which audio quality is influenced when the audio packet loss frequency is 1, or an average audio burst length serving as an average number of audio packets contained in an audio packet loss of one time, and the subjective quality assessment value estimation step of estimating a subjective quality assessment value based on the audio packet loss frequency and one of the average influence time and the average audio burst length.

Effects of the Invention

As described above, the present invention comprises the audio packet loss frequency calculation step of calculating an audio packet loss frequency, the average influence time/average audio burst length calculation step of calculating an average influence time or average audio burst length, and the subjective quality assessment value estimation step of estimating a subjective quality assessment value based on the audio packet loss frequency and the average influence time or average audio burst length. The present invention can therefore measure appropriate subjective quality of audio data on the receiving side in service in multimedia telecommunication services. The present invention can measure an accurate subjective quality assessment value in service by calculating several quality parameters on the receiving side. The present invention can timely and easily acquire, from the receiving side, information necessary to manage quality and deal with customer complaints.

BEST MODE FOR CARRYING OUT THE INVENTION

[Principle of Invention]

To solve the above-described problems, the present invention proposes a parametric packet-layer model. More specifically, a parametric model for estimating audio quality in multimedia telecommunication services is derived. An input parameter which varies in service, such as the audio bit rate, packet loss frequency, or average burst length, is calculated based on packet header information on the receiving side.

Multimedia telecommunication services are telecommunication services for transmitting a mixture of audio packets serving as IP packets containing audio data, and IP packets containing no audio data. In the multimedia telecommunication services, these packets are transmitted via an IP network.

Figure 1:
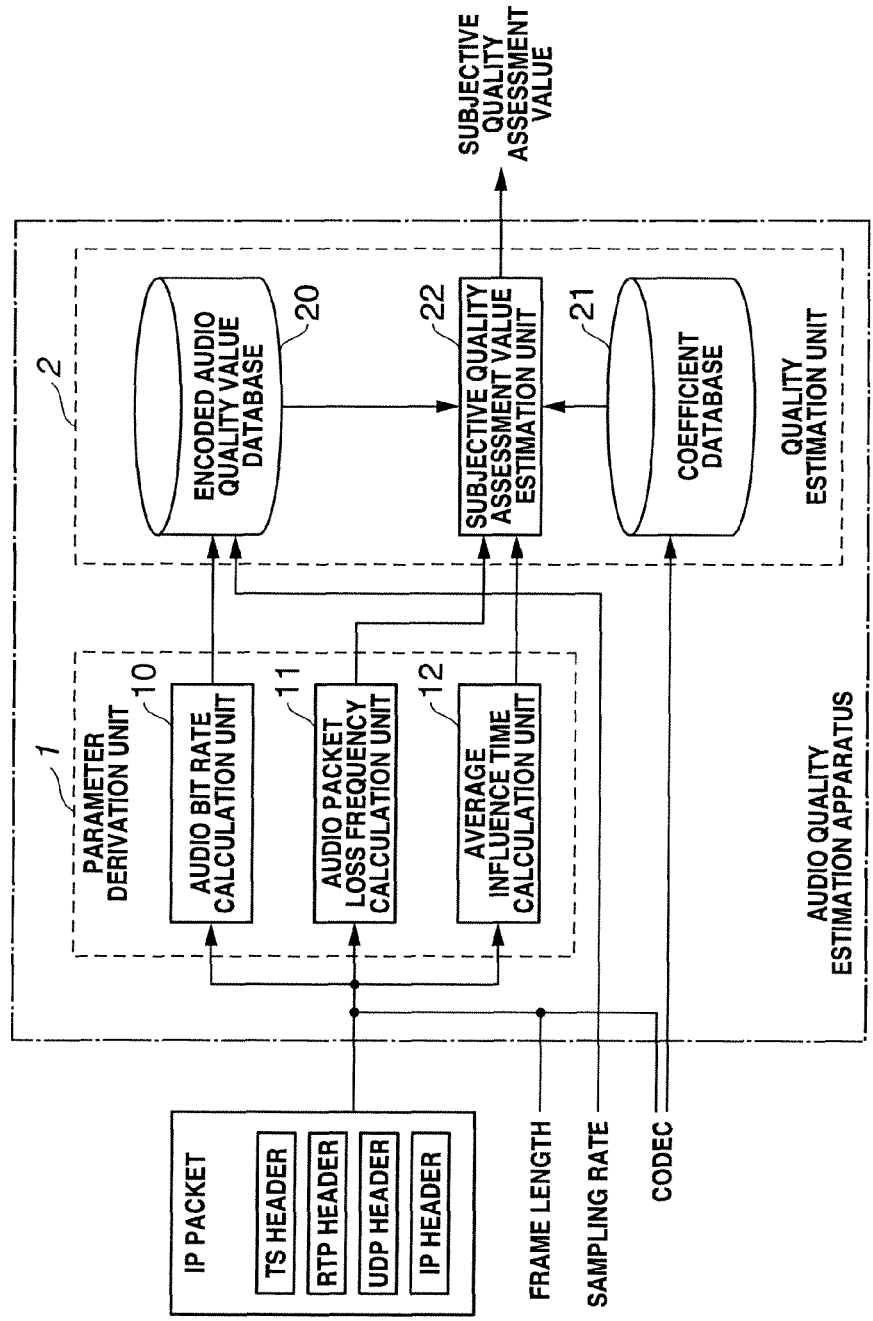
FIG. 1 is a block diagram showing the arrangement of an audio quality estimation apparatus to represent the principle of the present invention.

FIG. 1 is a block diagram showing the arrangement of an audio quality estimation apparatus to represent the principle of the present invention. The audio quality estimation apparatus in FIG. 1 includes a parameter derivation unit 1 which derives input parameters, and a quality estimation unit 2 which calculates the subjective quality assessment value of audio data based on input parameters.

The parameter derivation unit 1 includes an audio bit rate calculation unit 10, audio packet loss frequency calculation unit 11, and average influence time calculation unit 12. The audio bit rate calculation unit 10 calculates an audio bit rate based on information of IP packets received from an IP network (not shown). The audio packet loss frequency calculation unit 11 counts audio packet losses based on information of IP packets received from the IP network. The average influence time calculation unit 12 calculates an average influence time based on information of IP packets received from the IP network.

The quality estimation unit 2 includes an encoded audio quality value database 20, coefficient database 21, and subjective quality assessment value estimation unit 22. In the encoded audio quality value database 20, encoded audio quality values each representing the subjective quality of audio data whose quality has degraded upon encoding by a codec are accumulated in advance. In the coefficient database 21, coefficients for calculating a subjective quality assessment value are accumulated in advance. The subjective quality assessment value estimation unit 22 calculates a subjective quality assessment value based on the audio packet loss frequency and average influence time.

The audio quality estimation apparatus considers distortion caused by encoding and degradation arising from packet losses. In quality measurement of audio data whose quality has degraded owing to coding distortion, a subjective quality assessment value at each audio bit rate (kbps) and each sampling rate (kHz) is measured by a subjective quality assessment experiment, creating the encoded audio quality value database 20 as a subjective quality assessment value database. The encoded audio quality value database 20 is then used.

Figure 2:
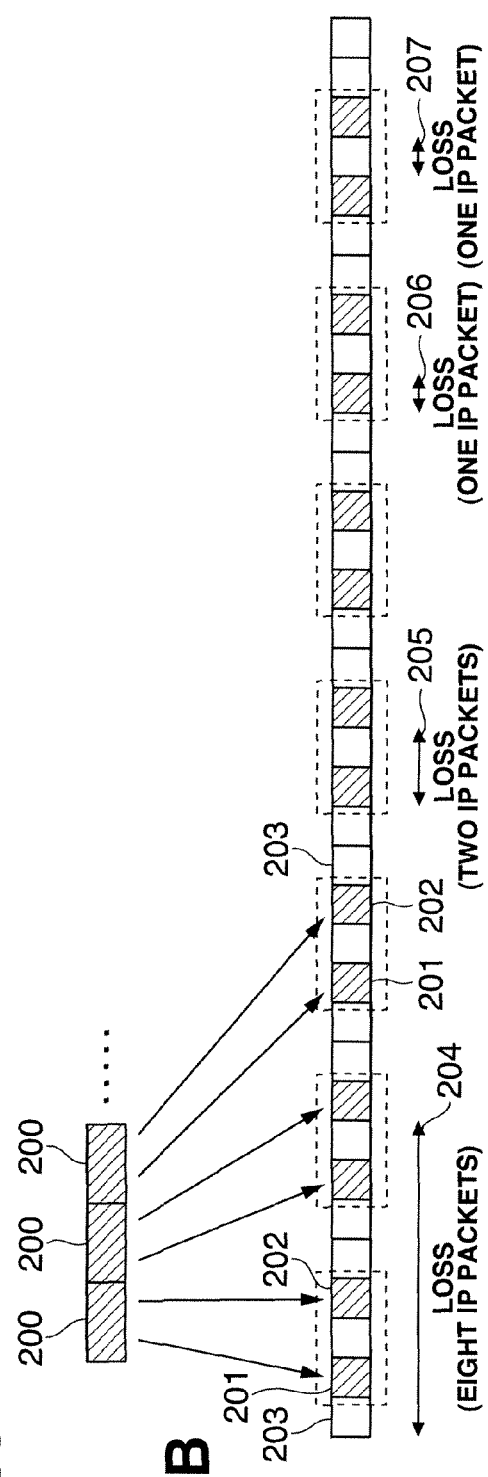
FIG. 2 is a view for explaining the audio packet loss frequency and average influence time.

Quality measurement of audio data whose quality has degraded due to packet losses is executed as follows. First, packet losses are divided by an audio packet loss frequency $L_a$ and an average influence time t (ms) of one loss. FIG. 2 is a view for explaining the audio packet loss frequency $L_a$ and the average influence time t. (A) of FIG. 2 represents audio data before diving it into IP packets. Reference numeral 200 denotes each frame. In this case, the length of one frame is 100 ms.

(B) of FIG. 2 represents IP packets which store audio data and other data. Audio packets 201 and 202 store audio data, and an IP packet 203 stores data other than audio data. In the example of (B) of FIG. 2, audio data of one frame is divided into two, which are stored in the IP packets 201 and 202, respectively. Assume that losses 204 to 207 in (B) of FIG. 2 are generated in the IP packets. The loss 204 represents a case in which eight IP packets are lost continuously. The loss 205 represents a case in which two IP packets are lost continuously. The losses 206 and 207 represent a case in which one IP packet is lost.

When losses are counted for IP packets, the IP packet loss frequency is 4, and the lost IP packet count is 12. The average burst length obtained by dividing the lost IP packet count by the IP packet loss frequency is 12/4=3.

The audio packet loss frequency $L_a$ is obtained by, when at least one audio packet to be assessed exists in singly or continuously generated IP packet losses, counting the packet losses as a packet loss of one time regardless of the continuous length. Since the loss 207 is a loss of an IP packet containing data other than audio data, the losses 204 to 206 are counted to calculate the audio packet loss, as shown in (C) of FIG. 2. Thus, the audio packet loss frequency is 3.

The average influence time t is an average time during which audio quality is influenced when the audio packet loss frequency is 1. Audio data of two frames are lost in the loss 204, and that of one frame is lost in each of the losses 205 and 206. The total number of frames influenced by these losses is 4, so the average number of frames influenced by three losses is 4/3=1.333 . . . . The average influence time is a value obtained by multiplying the average number of influenced frames by the frame length, and is 1.333 . . . ×100 (ms)= 133.333 . . . (ms).

Next, the user of the audio quality estimation apparatus derives a model (quality estimation function) for estimating a subjective quality assessment value from the audio packet loss frequency and average influence time.

Figure 3:
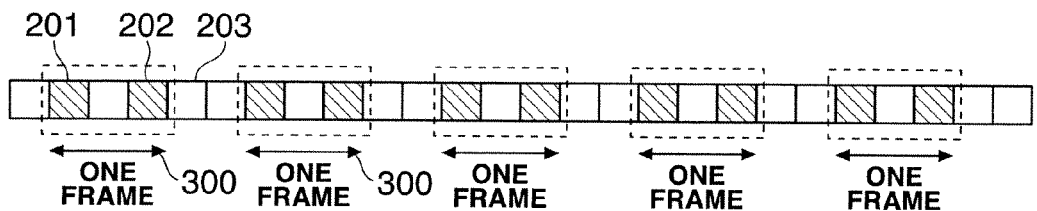
FIG. 3 is a view showing an IP packet used in a subjective quality assessment experiment to obtain the relationship between the audio packet loss frequency and the QoE.

A reference value t' (ms) is set for the average influence time, and the average influence time is fixed to the reference influence time t' (ms). More specifically, an IP packet stream is prepared, in which one frame length is set to t' (ms), packet losses 300 are generated to lose audio data of one frame, as shown in FIG. 3, and the packet loss 300 is set not to exceed one frame. In this case, the average number of influenced frames is 1, so the average influence time is t' (ms). Then, a subjective quality assessment experiment is conducted to reproduce audio data transmitted by this IP packet stream, assess the reproduced speech by a subject, and determine the QoE.

Figure 4:
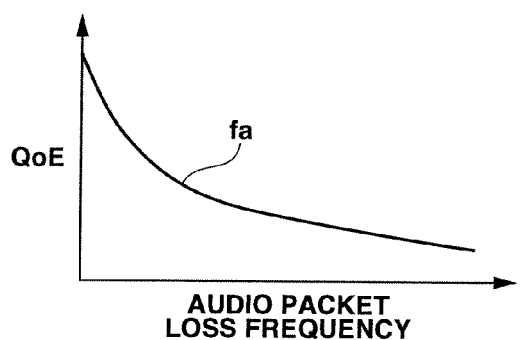
FIG. 4 is a graph exemplifying the relationship between the audio packet loss frequency and the QoE.

This subjective quality assessment experiment is conducted for IP packets with various audio packet loss frequencies, obtaining the relationship between the audio packet loss frequency and the QoE as shown in FIG. 4. The user derives a relation fa between the audio packet loss frequency and the QoE from the relationship shown in FIG. 4.

Figure 5:
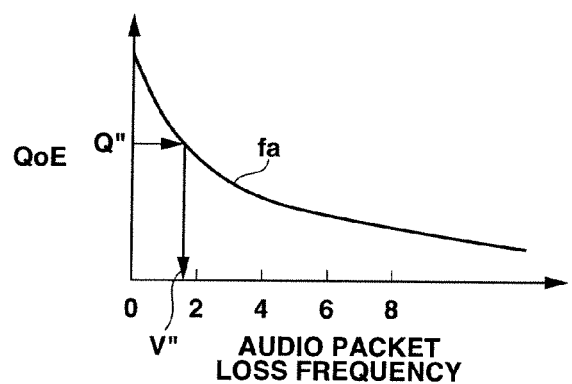
FIG. 5 is a graph for explaining a method of converting an audio packet loss of one time for an average influence time length other than a reference influence time length into an audio packet loss frequency for a reference influence time length which causes quality degradation equivalent to this loss.

After that, the subjective quality assessment experiment is conducted for an IP packet stream having an average influence time other than the reference influence time t'. At this time, the subjective quality assessment experiment is conducted in the foregoing way for an IP packet stream in which the average influence time is set to t" (ms) other than the reference value t'(ms) and the audio packet loss frequency is set to 1. A QoE obtained at this time is defined as Q". Based on the relation fa, the user calculates an audio packet loss frequency at which the QoE Q" is obtained when the average influence time is set to the reference value t'(ms) (FIG. 5). The calculated audio packet loss frequency is defined as a virtual audio packet loss frequency V".

Figure 6:
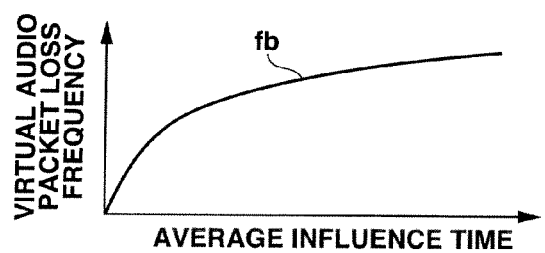
FIG. 6 is a graph exemplifying the relationship between the average influence time and the virtual audio packet loss frequency.

The subjective quality assessment experiment and the calculation of the virtual audio packet loss frequency V" are performed for IP packet streams having various average influence times t" (ms), obtaining the relationship between the average influence time and the virtual audio packet loss frequency as shown in FIG. 6. The user derives a relation fb between the average influence time and the virtual audio packet loss frequency from the relationship shown in FIG. 6. The thus derived relations fa and fb are set in advance in the subjective quality assessment value estimation unit 22.

When estimating the quality of audio data, the subjective quality assessment value estimation unit 22 calculates a virtual audio packet loss frequency V using the relation fb from the average influence time length t calculated by the average influence time calculation unit 12. The subjective quality assessment value estimation unit 22 calculates a value ($V \times L_a$) by multiplying the virtual audio packet loss frequency V by the audio packet loss frequency $L_a$ counted by the audio packet loss frequency calculation unit 11. The subjective quality assessment value estimation unit 22 regards a quality to be obtained as the same as one obtained when the reference influence time is t' and losses occur ($V \times L_a$) times. Then, the subjective quality assessment value estimation unit 22 calculates the subjective quality assessment value Q of audio data from the audio packet loss frequency ($V \times L_a$) using the relation fa.

The audio quality estimation apparatus according to the present invention can estimate quality in real time by calculating several input parameters from header information of IP packets received from an IP network.

The audio bit rate calculation unit 10 measures data of audio information from header information of IP packets received from the IP network, and calculates a data amount per sec, thereby calculating an audio bit rate.

The audio packet loss frequency calculation unit 11 detects lost IP packets from header information of IP packets received from the IP network, and estimates the number of audio data-containing IP packets out of the lost IP packets based on the ratio of audio data to all data. Then, the audio packet loss frequency calculation unit 11 sets the loss frequency of audio data-containing IP packets estimated in a predetermined time as an audio packet loss frequency.

Similarly, the average influence time calculation unit 12 detects lost IP packets from header information of IP packets received from the IP network, and estimates the number of audio data-containing IP packets out of the lost IP packets based on the ratio of audio data to all data. Then, the average influence time calculation unit 12 sets the average of the burst lengths of audio data-containing IP packets estimated in a predetermined time as an average audio burst length.

[First Embodiment]

Figure 7:
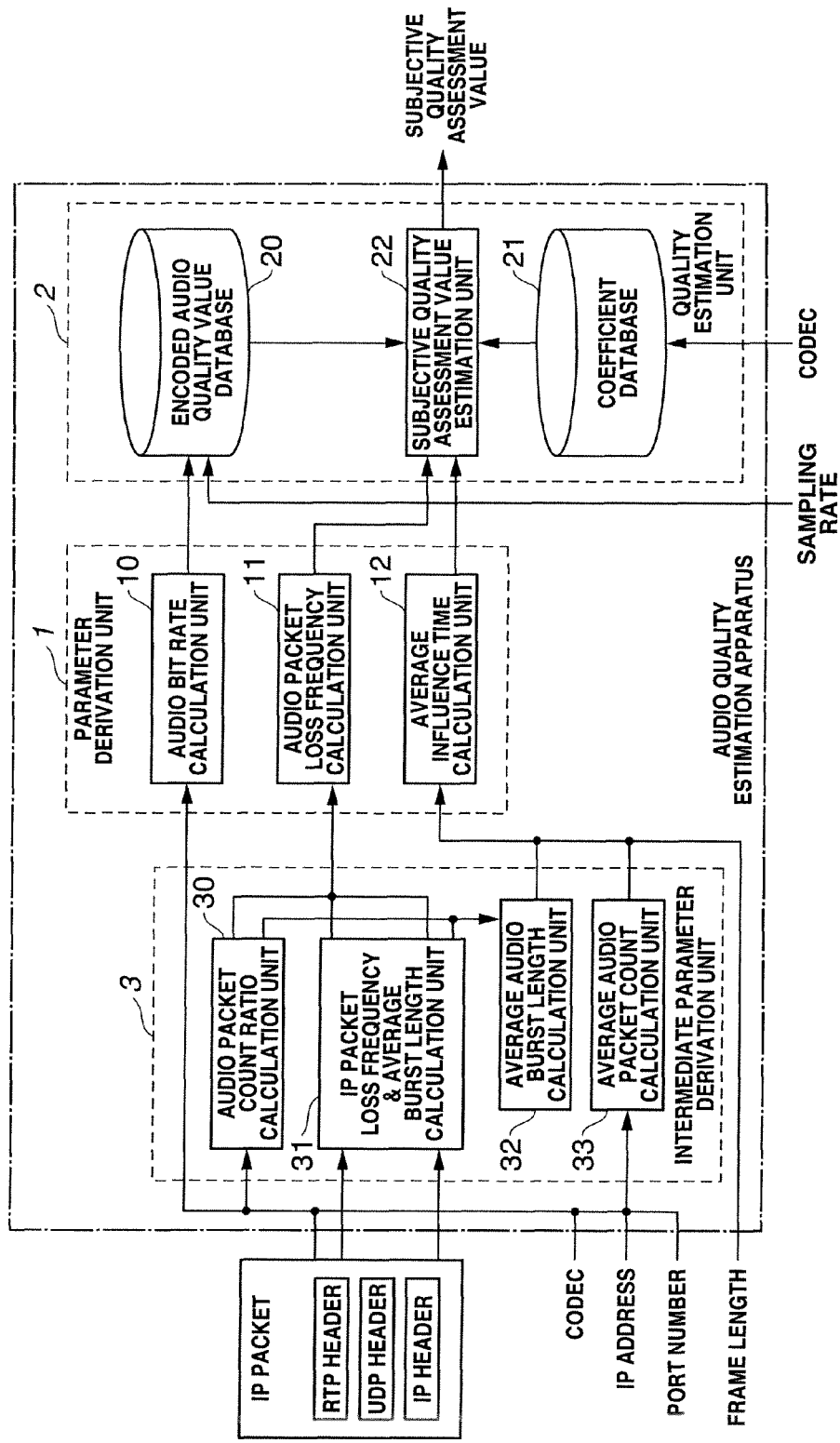
FIG. 7 is a block diagram showing the arrangement of an audio quality estimation apparatus according to the first embodiment of the present invention.

The first embodiment of the present invention will be described with reference to the accompanying drawings. FIG. 7 is a block diagram showing the arrangement of an audio quality estimation apparatus according to the first embodiment of the present invention. The same reference numerals as those in FIG. 1 denote the same parts.

The audio quality estimation apparatus includes a parameter derivation unit 1, quality estimation unit 2, and intermediate parameter derivation unit 3. The intermediate parameter derivation unit 3 derives intermediate parameters for obtaining the audio packet loss frequency and average influence time that are derived by the parameter derivation unit 1.

The intermediate parameter derivation unit 3 includes an audio packet count ratio calculation unit 30, IP packet loss frequency & average burst length calculation unit 31, average audio burst length calculation unit 32, and average audio packet count calculation unit 33. The audio packet count ratio calculation unit 30 calculates the ratio of the audio packet count to the total IP packet count based on information of IP packets received from an IP network (not shown). Based on information of received IP packets, the IP packet loss frequency & average burst length calculation unit 31 calculates an IP packet loss frequency by counting singly or continuously generated IP packet losses as an IP packet loss of one time regardless of the continuous length. The IP packet loss frequency & average burst length calculation unit 31 also calculates an average burst length as the average number of IP packets contained in an IP packet loss of one time. Based on the average burst length and the ratio of the audio packet count to the total IP packet count, the average audio burst length calculation unit 32 calculates an average audio burst length as the average number of audio packets contained in an audio packet loss of one time. Based on information of received IP packets, the average audio packet count calculation unit 33 calculates the average number of audio packets which store audio data of one frame.

Figure 8:
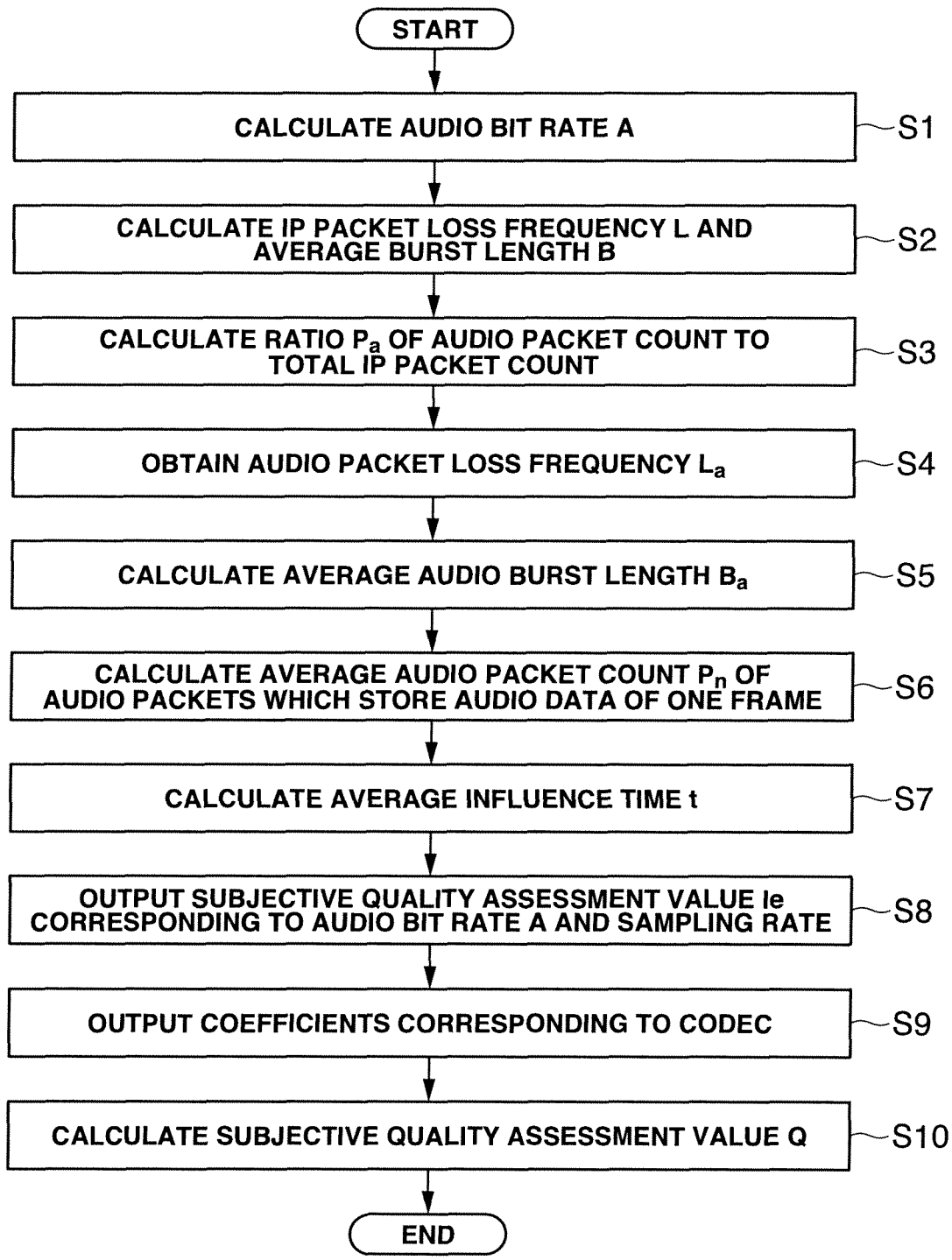
FIG. 8 is a flowchart showing the operation of the audio quality estimation apparatus according to the first embodiment of the present invention.

The first embodiment targets data transmission using an IP/UDP (User Datagram Protocol)/RTP (Real-time Transport Protocol) packet structure. FIG. 8 is a flowchart showing the operation of the audio quality estimation apparatus according to the first embodiment. The audio quality estimation apparatus first obtains parameters.

Figure 9:
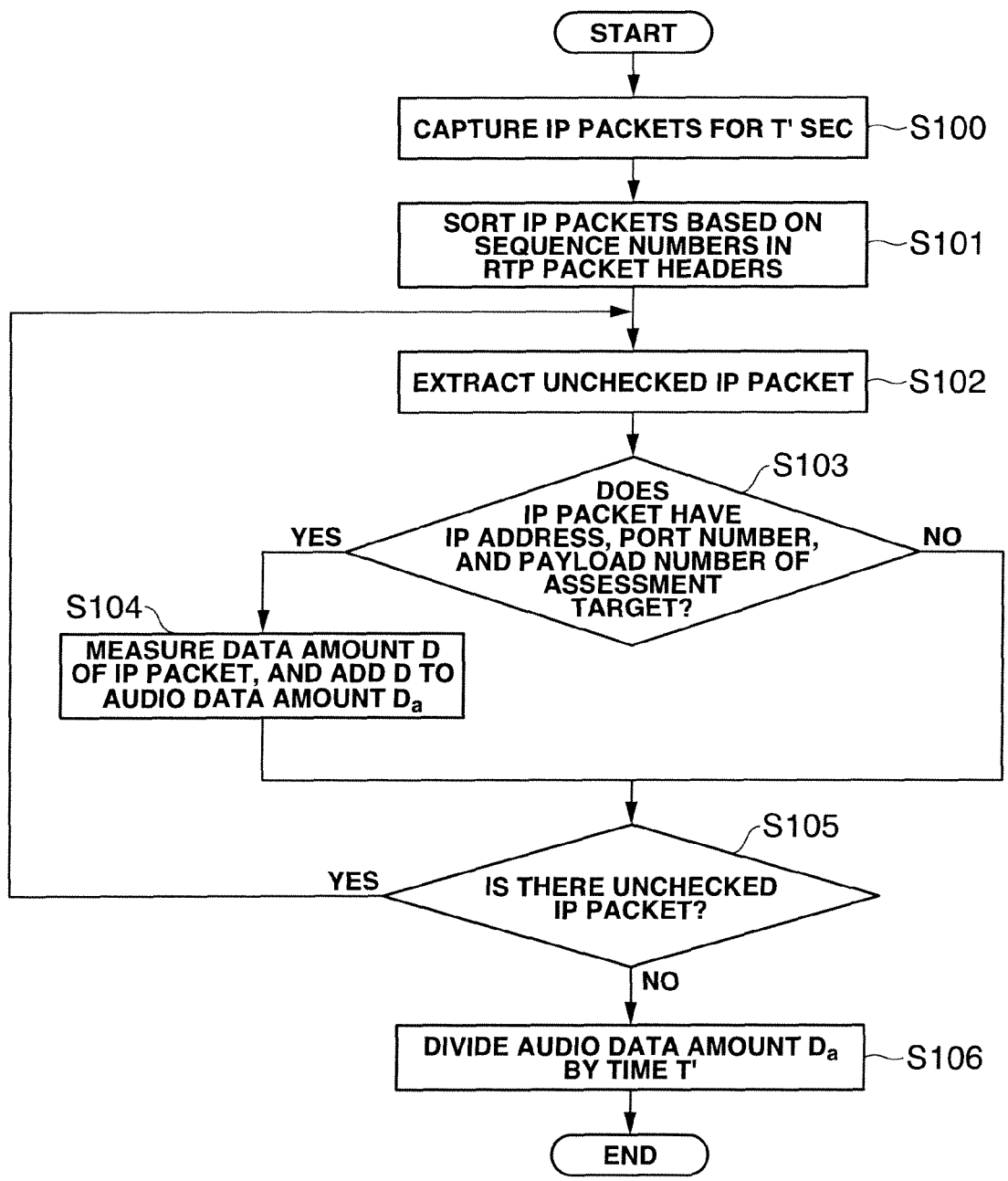
FIG. 9 is a flowchart showing an audio bit rate calculation method by an audio bit rate calculation unit in the first embodiment of the present invention.

An audio bit rate calculation unit 10 calculates an audio bit rate A (step S1). FIG. 9 is a flowchart showing a method of calculating the audio bit rate A by the audio bit rate calculation unit 10. First, the audio bit rate calculation unit 10 captures an IP packet stream for T' sec (step S100), and sorts IP packets based on sequence numbers in the RTP headers of the IP packets in the IP packet stream (step S101).

Then, the audio bit rate calculation unit 10 extracts one of unchecked IP packets from the IP packet stream. Further, the audio bit rate calculation unit 10 extracts a source IP address and destination IP address from the IP header of the IP packet, extracts a start port number and destination port number from the UDP header of the IP packet, and extracts a 7-bit payload type number from the RTP header of the IP packet (step S102).

The audio bit rate calculation unit 10 determines whether the extracted source IP address and destination IP address match the source IP address and destination IP address of an assessment target, the extracted start port number and destination port number match the start port number and destination port number of the assessment target, and the extracted payload type number matches the payload type number of the assessment target (step S103).

If all the source IP address, destination IP address, start port number, destination port number, and payload type number extracted from the IP packet match the values of the assessment target, the audio bit rate calculation unit 10 determines that the extracted IP packet is an audio packet to be assessed, and advances to step S104. If at least one of the source IP address, destination IP address, start port number, destination port number, and payload type number does not match the value of the assessment target, the audio bit rate calculation unit 10 advances to step S105.

In step S104, the audio bit rate calculation unit 10 measures the data amount D (kb) of the audio packet, and adds the measured data amount D to an audio data amount $D_a$ (kb) which is a cumulative value.

After the end of step S104 or if NO in step S103, the audio bit rate calculation unit 10 determines whether an unchecked IP packet exists in the IP packet stream (step S105). If an unchecked IP packet exists, the audio bit rate calculation unit 10 returns to step S102; if no unchecked IP packet exists, advances to step S106. The processes in steps S102 to S105 are repeated until all the IP packets of the IP packet stream are checked.

After the end of the check, the audio bit rate calculation unit 10 calculates the audio bit rate A by dividing the audio data amount $D_a$ (kb) by the time T' (step S106):

$$A = D_a / T' \tag{1}$$

Then, the processing by the audio bit rate calculation unit 10 ends.

In derivation of an audio packet loss frequency $L_a$, an IP packet loss frequency L, an average burst length B, and a ratio $P_a$ of the audio packet count to the total IP packet count are calculated as three intermediate parameters.

Figure 10:
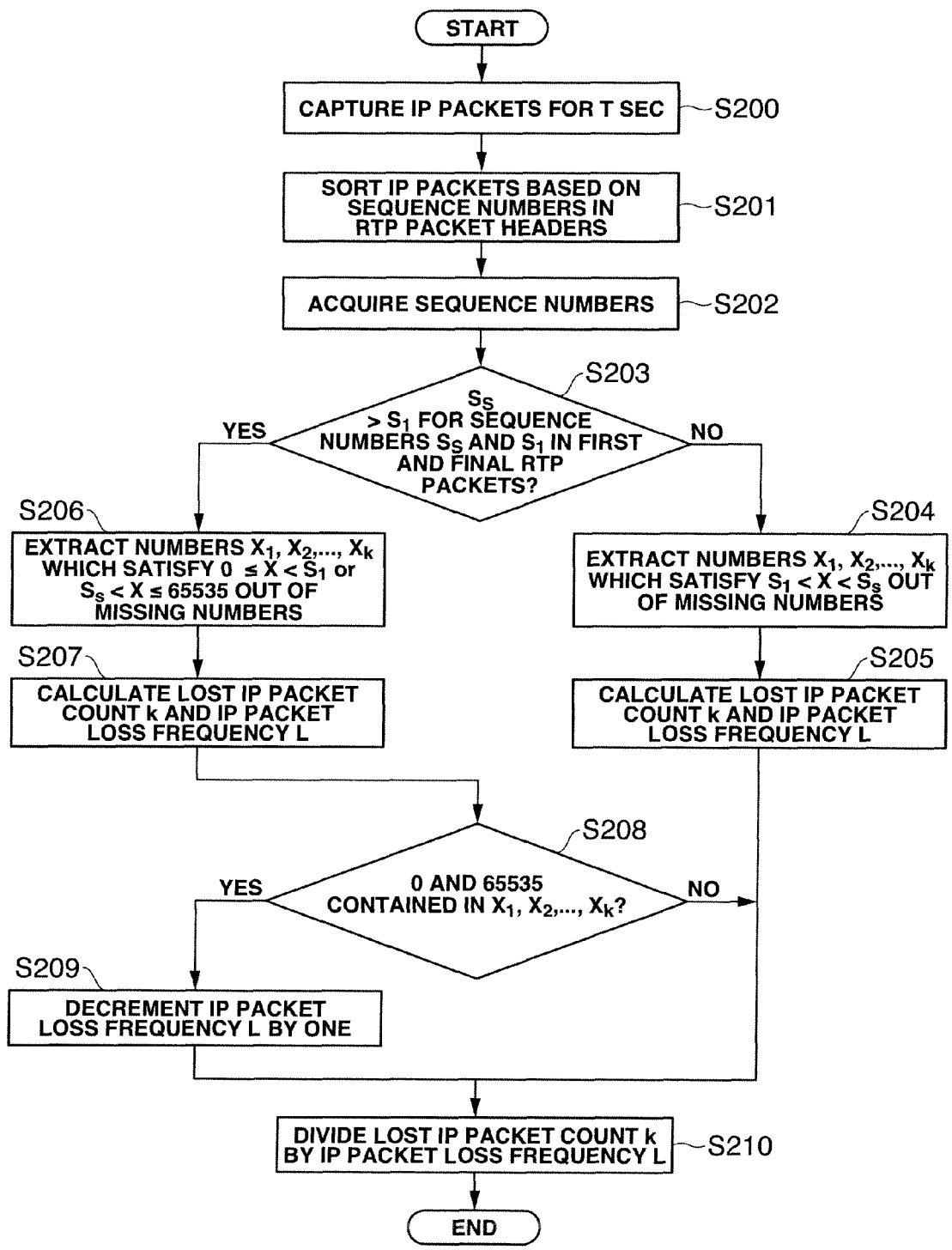
FIG. 10 is a flowchart showing a method of calculating the IP packet loss frequency and average burst length by an IP packet loss frequency & average burst length calculation unit in the first embodiment of the present invention.

The IP packet loss frequency & average burst length calculation unit 31 calculates the IP packet loss frequency L and average burst length B (step S2 in FIG. 8). FIG. 10 is a flowchart showing a method of calculating the IP packet loss frequency L and average burst length B by the IP packet loss frequency & average burst length calculation unit 31.

The IP packet loss frequency & average burst length calculation unit 31 captures an IP packet stream for T sec (step S200), and sorts IP packets based on sequence numbers in the RTP headers of the IP packets in the IP packet stream (step S201). Then, the IP packet loss frequency & average burst length calculation unit 31 acquires sequence numbers in the RTP headers of the respective IP packets (step S202).

The IP packet loss frequency & average burst length calculation unit 31 compares the sequence number of the first RTP packet and the sequence number $S_1$ of the final RTP packet that have been acquired in step S202, and determines whether the first sequence number $S_s$ is larger than the final sequence number $S_1$ (step S203).

If the first sequence number $S_s$ is smaller than the final sequence number $S_1$ (NO in step S203), the IP packet loss frequency & average burst length calculation unit 31 extracts numbers $X_1, X_2, \ldots, X_k$ which do not exist as sequence numbers acquired in step S202, out of all Xs which satisfy $S < X < S_1$ (step S204).

The IP packet loss frequency & average burst length calculation unit 31 obtains a lost IP packet count k serving as the cumulative number of missing sequence numbers $X_1, X_2, \ldots, X_k$. In addition, the IP packet loss frequency & average burst length calculation unit 31 calculates an IP packet loss frequency based on the continuity of the sequence numbers $X_1, X_2, \ldots, X_k$, and sets the calculated frequency as the IP packet loss frequency L in T sec (step S205). In calculation of the IP packet loss frequency L, if sequence numbers are missed continuously, losses of IP packets having continuous sequence numbers are counted as a packet loss of one time.

If the first sequence number $S_s$ is larger than the final sequence number $S_1$ (YES in step S203), the IP packet loss frequency & average burst length calculation unit 31 extracts numbers $X_1, X_2, \ldots, X_k$ which do not exist as sequence numbers acquired in step S202, out of all Xs which satisfy $0 \leq X \leq S_1$ or $S_s < X \leq 65535$ (step S206).

The IP packet loss frequency & average burst length calculation unit 31 obtains a lost IP packet count k serving as the cumulative number of missing sequence numbers $X_1, X_2, \ldots, X_k$. Also, the IP packet loss frequency & average burst length calculation unit 31 calculates an IP packet loss frequency based on the continuity of the sequence numbers $X_1, X_2, \ldots, X_k$, and sets the calculated frequency as the IP packet loss frequency L in T sec (step S207).

After the end of the process in step S207, the IP packet loss frequency & average burst length calculation unit 31 determines whether both 0 and 65535 exist in the sequence numbers $X_1, X_2, \ldots, X_k$ extracted in step S206 (step S208). If both 0 and 65535 exist in the sequence numbers $X_1, X_2, \ldots, X_k$, the IP packet loss frequency & average burst length calculation unit 31 advances to step S209; if at least one of 0 and 65535 does not exist, to step S210.

If both 0 and 65535 exist in the sequence numbers $X_1, X_2, \ldots, X_k$, a loss containing the sequence number 0 and one containing the sequence number 65535 are counted as a loss of one time. Thus, the IP packet loss frequency & average burst length calculation unit 31 sets, as a final IP packet loss frequency L, a value obtained by decrementing the IP packet loss frequency L calculated in step S207 by one (step S209). If at least one of 0 and 65535 does not exist in the sequence numbers $X_1, X_2, \ldots, X_k$, the IP packet loss frequency & average burst length calculation unit 31 directly sets the value calculated in step S207 as the IP packet loss frequency L.

Finally, the IP packet loss frequency & average burst length calculation unit 31 calculates the average burst length B by dividing the lost IP packet count k by the IP packet loss frequency L (step S210):

$$B = k/L \qquad (2)$$

Then, the processing by the IP packet loss frequency & average burst length calculation unit 31 ends.

Figure 11:
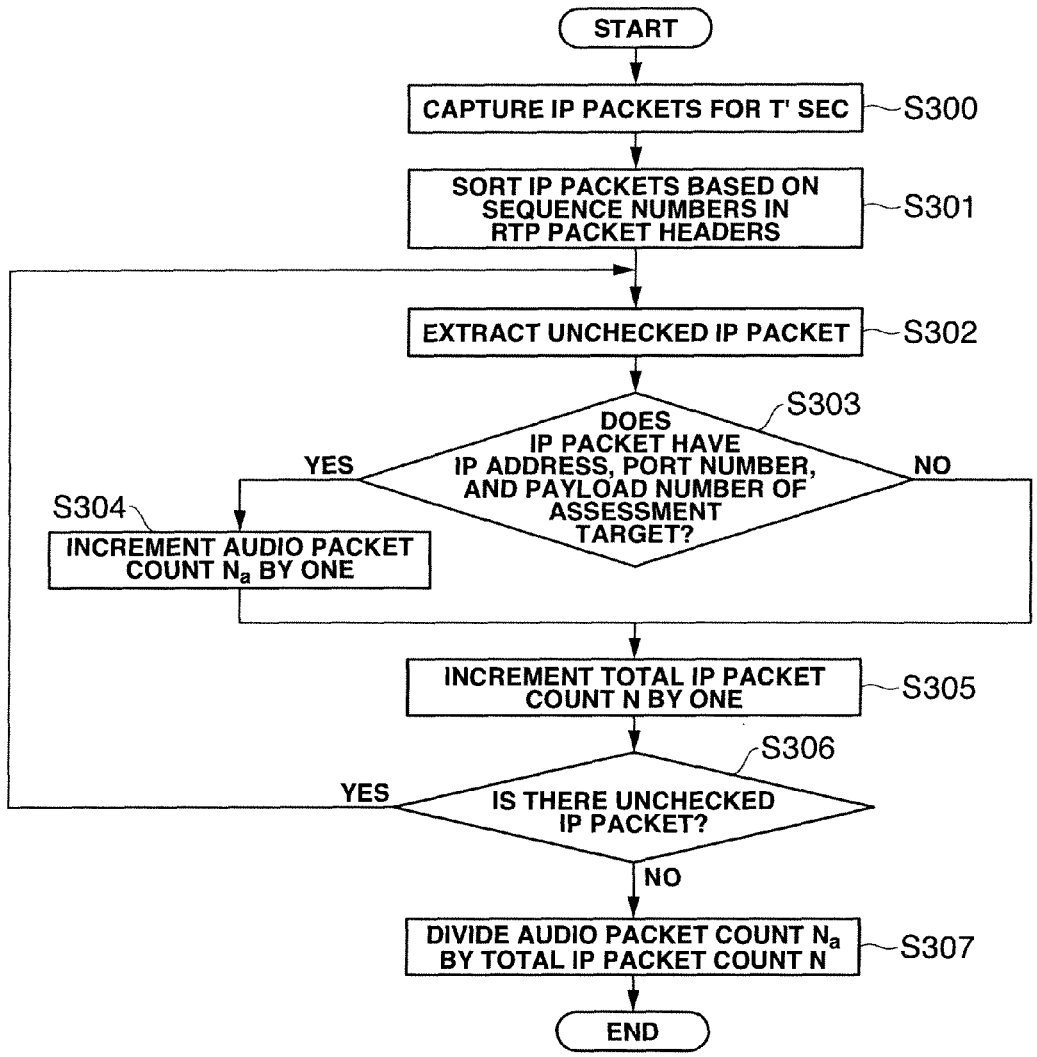
FIG. 11 is a flowchart showing an audio packet count ratio calculation method by an audio packet count ratio calculation unit in the first embodiment of the present invention.

The audio packet count ratio calculation unit 30 calculates the ratio $P_a$ of the audio packet count to the total IP packet count (step S3 in FIG. 8). FIG. 11 is a flowchart showing a method of calculating the ratio $P_a$ of the audio packet count by the audio packet count ratio calculation unit 30.

The audio packet count ratio calculation unit 30 captures an IP packet stream for T' sec (step S300), and sorts IP packets based on sequence numbers in the RTP headers of the IP packets in the IP packet stream (step S301).

Processes in steps S302 and S303 are the same as those in steps S102 and S103 of FIG. 9. If all the source IP address, destination IP address, start port number, destination port number, and payload type number extracted from the IP packet match the values of the assessment target in step S303, the audio packet count ratio calculation unit 30 determines that the extracted IP packet is an audio packet to be assessed, and advances to step S304. If at least one of the source IP address, destination IP address, start port number, destination port number, and payload type number does not match the value of the assessment target, the audio packet count ratio calculation unit 30 advances to step S305.

In step S304, the audio packet count ratio calculation unit 30 increments an audio packet count $N_a$ by one.

After the end of the process in step S304 or if NO in step S303, the audio packet count ratio calculation unit 30 increments the total IP packet count N of the IP packet stream by one (step S305).

Then, the audio packet count ratio calculation unit 30 determines whether an unchecked IP packet exists in the IP packet stream (step S306). If an unchecked IP packet exists, the audio packet count ratio calculation unit 30 returns to step S302; if no unchecked IP packet exists, advances to step S307. The processes in steps S302 to S306 are repeated until all the IP packets of the IP packet stream are checked.

After the end of the check, the audio packet count ratio calculation unit 30 calculates the ratio $P_a$ of the audio packet count $N_a$ to the total IP packet count N by dividing the audio packet count $N_a$ by the total IP packet count N (step S307):

$$P_a = N_a/N \qquad (3)$$

Then, the processing by the audio packet count ratio calculation unit 30 ends.

Figure 12:
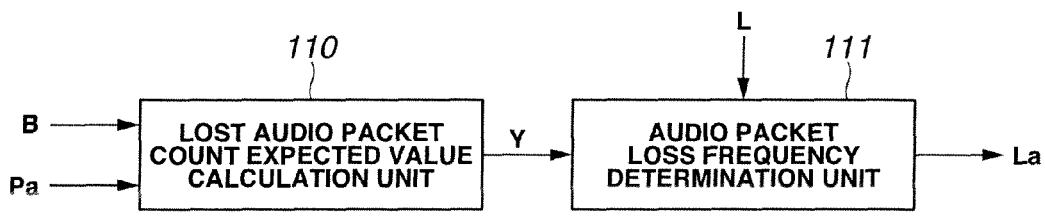
FIG. 12 is a block diagram exemplifying the arrangement of an audio packet loss frequency calculation unit in the first embodiment of the present invention.
Figure 13:
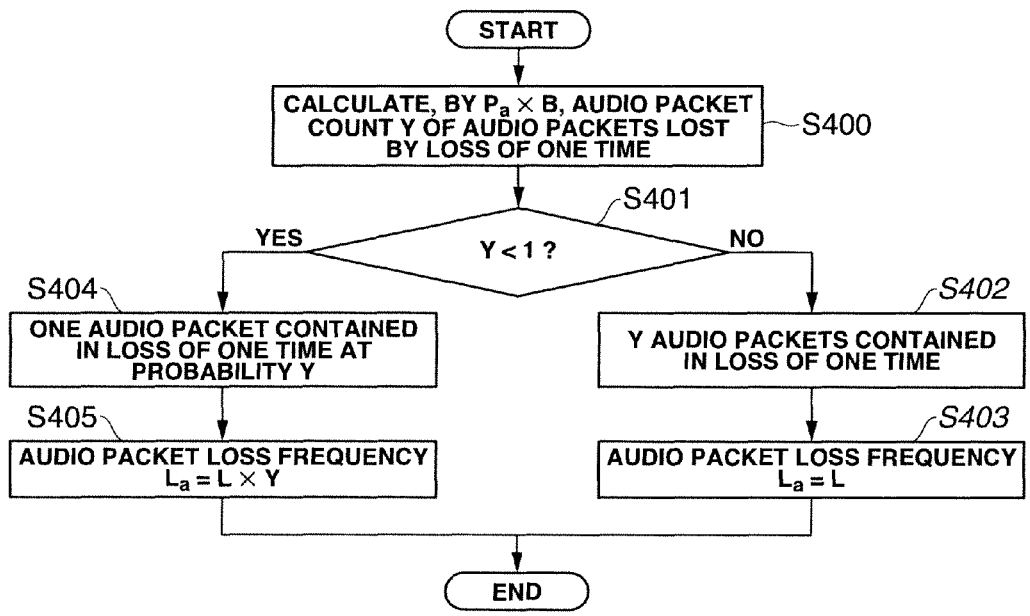
FIG. 13 is a flowchart showing an audio packet loss frequency calculation method by the audio packet loss frequency calculation unit in the first embodiment of the present invention.

An audio packet loss frequency calculation unit 11 counts the audio packet loss frequency $L_a$ based on the IP packet loss frequency L, the average burst length B, and the ratio $P_a$ of the audio packet count $N_a$ to the total IP packet count N which have been calculated in the above way (step S4 in FIG. 8). FIG. 12 is a block diagram exemplifying the arrangement of the audio packet loss frequency calculation unit 11. FIG. 13 is a flowchart showing a method of calculating the audio packet loss frequency $L_a$ by the audio packet loss frequency calculation unit 11.

The audio packet loss frequency calculation unit 11 includes a lost audio packet count expected value calculation unit 110 and audio packet loss frequency determination unit 111. The lost audio packet count expected value calculation unit 110 multiplies the average burst length B and the ratio $P_a$ of the audio packet count $N_a$ to the total IP packet count N, thereby calculating the expected value of the number of audio packets lost by an IP packet loss of one time. The audio packet loss frequency determination unit 111 determines the audio packet loss frequency $L_a$ from the expected value of the number of audio packets and the IP packet loss frequency L.

The audio packet loss frequency calculation unit 11 cannot determine the type of data stored in the payload of a lost IP packet. Thus, the audio packet loss frequency calculation unit 11 calculates an expected value Y of the number of audio packets lost by an IP packet loss of one time, based on the average burst length B and the ratio $P_a$ of the audio packet count $N_a$ to the total IP packet count N (step S400):

$$Y = B \times P_a \qquad (4)$$

Subsequently, the audio packet loss frequency calculation unit 11 determines whether the expected value Y is smaller than 1 (step S401). If $Y \geq 1$, the audio packet loss frequency calculation unit 11 determines that an IP packet loss of one time always contains Y audio packets (step S402), and sets the audio packet loss frequency La=L (step S403).

If Y<1 in step S401, the audio packet loss frequency calculation unit 11 determines that a packet loss of one time contains one audio packet at probability Y (=B×$P_a$) (step S404). In this case, one audio packet is lost in L×Y packet losses at the IP packet loss frequency L. The audio packet loss frequency calculation unit 11 therefore sets the audio packet loss frequency $L_a$=L×Y (step S405). Accordingly, the processing by the audio packet loss frequency calculation unit 11 ends.

In calculation of an average influence time t, an average audio burst length $B_a$, and an average audio packet count $P_n$ of audio packets which store audio data of one frame are calculated as two intermediate parameters.

Figure 14:
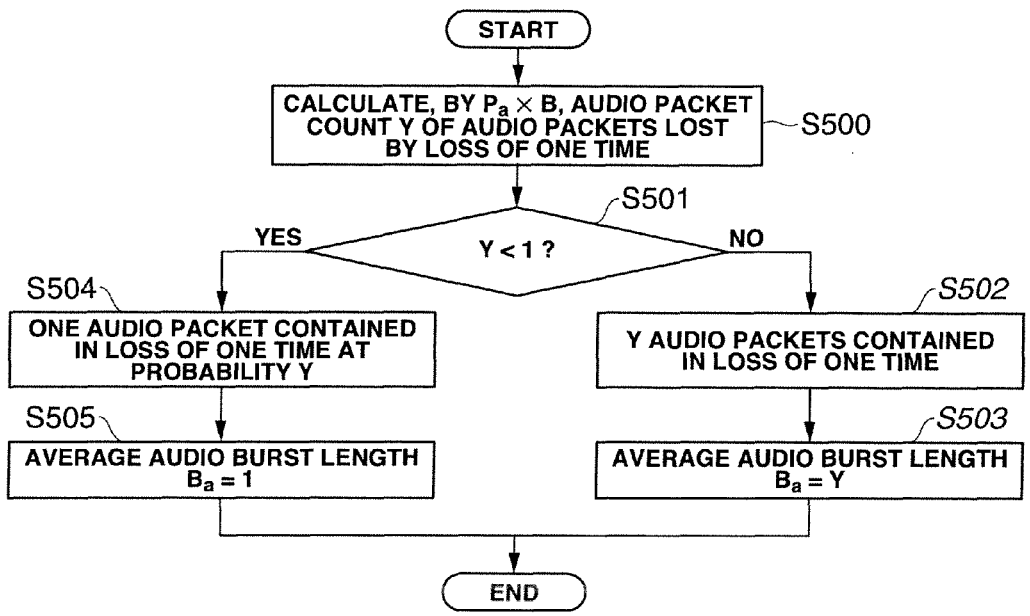
FIG. 14 is a flowchart showing an average audio burst length calculation method by an average audio burst length calculation unit in the first embodiment of the present invention.

The average audio burst length calculation unit 32 calculates the average audio burst length $B_a$ (step S5 in FIG. 8). FIG. 14 is a flowchart showing a method of calculating the average audio burst length $B_a$ by the average audio burst length calculation unit 32.

Processes in steps S500, S501, S502, and S504 are the same as those in steps S400, S401, S402, and S404 of FIG. 13. If Y≥1, the average audio burst length calculation unit 32 sets the average audio burst length Ba=Y (step S503); if Y<1, sets the average audio burst length Ba=1 (step S505). Then, the processing by the average audio burst length calculation unit 32 ends.

Figure 15:
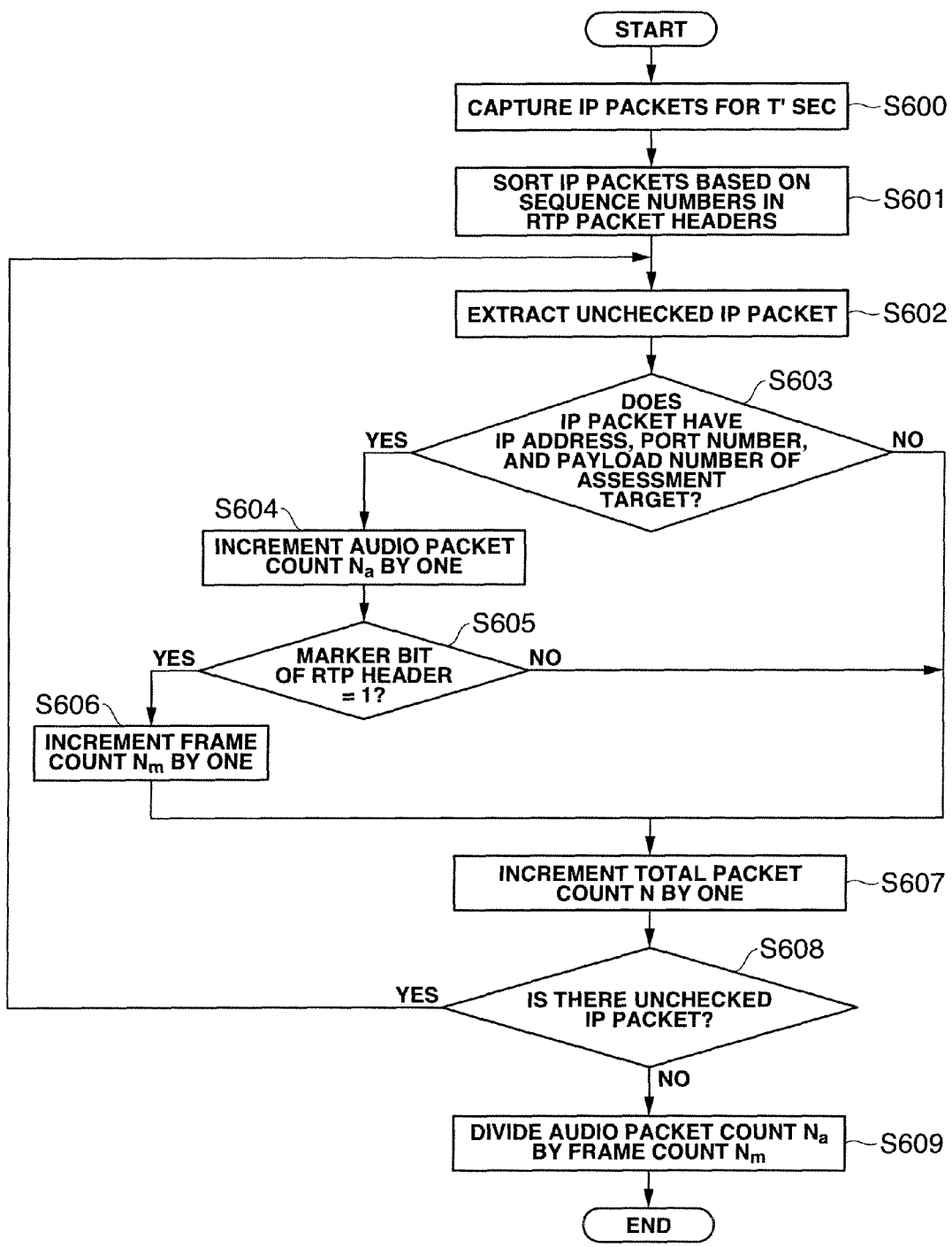
FIG. 15 is a flowchart showing an average audio packet count calculation method by an average audio packet count calculation unit in the first embodiment of the present invention.

The average audio packet count calculation unit 33 calculates the average audio packet count $P_n$ of audio packets which store audio data of one frame (step S6 in FIG. 8). FIG. 15 is a flowchart showing a method of calculating the average audio packet count $P_n$ by the average audio packet count calculation unit 33.

The average audio packet count calculation unit 33 captures an IP packet stream for T' sec (step S600), and sorts IP packets based on sequence numbers in the RTP headers of the IP packets in the IP packet stream (step S601).

Processes in steps S602, S603, and S604 are the same as those in steps S302, S303, and S304 of FIG. 11.

The average audio packet count calculation unit 33 increments the audio packet count $N_a$ by one in step S604, and determines whether the marker bit of the RTP header contained in the audio packet extracted in step S603 is 1 (step S605). A marker bit value "1" means that the packet is an audio packet containing the final data of the frame of audio data. Hence, if the marker bit is 1, the average audio packet count calculation unit 33 increments a frame count $N_m$ by one (step S606).

After the end of the process in step S606 or if NO in step S603 or S605, the average audio packet count calculation unit 33 increments the total IP packet count N of the IP packet stream by one (step S607).

After that, the average audio packet count calculation unit 33 determines whether an unchecked IP packet exists in the IP packet stream (step S608). If an unchecked IP packet exists, the average audio packet count calculation unit 33 returns to step S602; if no unchecked IP packet exists, advances to step S609. The processes in steps S602 to S608 are repeated until all the IP packets of the IP packet stream are checked.

After the end of the check, the average audio packet count calculation unit 33 calculates the average audio packet count $P_n$ of audio packets which store audio data of one frame, by dividing the audio packet count $N_a$ by the frame count $N_m$ (step S609):

$$P_n = N_a/N_m \quad (5)$$

Accordingly, the processing by the average audio packet count calculation unit 33 ends.

Figure 16:
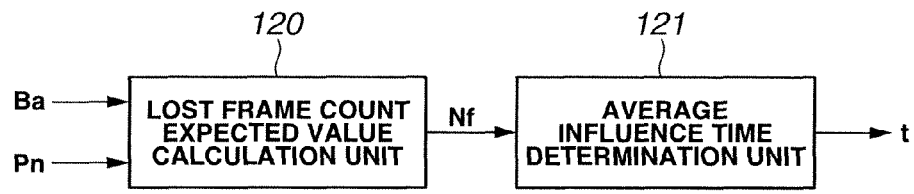
FIG. 16 is a block diagram exemplifying the arrangement of an average influence time calculation unit in the first embodiment of the present invention.
Figure 17:
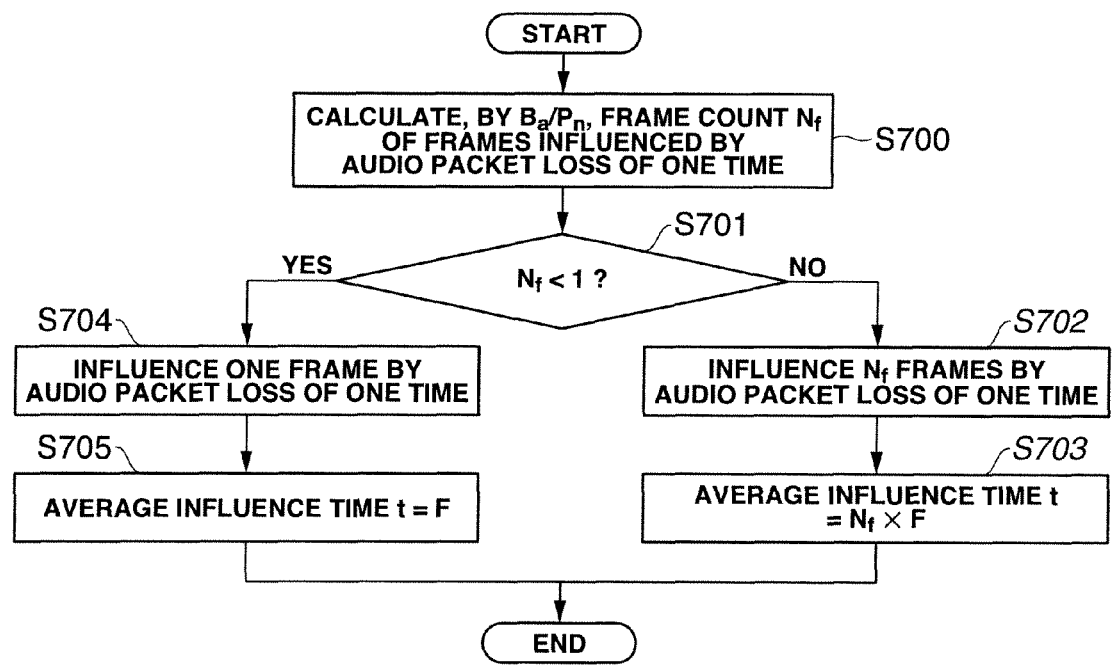
FIG. 17 is a flowchart showing an average influence time calculation method by the average influence time calculation unit in the first embodiment of the present invention.

An average influence time calculation unit 12 calculates the average influence time t based on the average audio burst length $B_a$ and the average audio packet count $P_n$ of audio packets which store audio data of one frame, which have been calculated in the above manner (step S7 in FIG. 8). FIG. 16 is a block diagram exemplifying the arrangement of the average influence time calculation unit 12. FIG. 17 is a flowchart showing a method of calculating the average influence time t by the average influence time calculation unit 12.

The average influence time calculation unit 12 includes a lost frame count expected value calculation unit 120 and average influence time determination unit 121. Based on the average audio burst length $B_a$ and the average audio packet count $P_n$ of audio packets which store audio data of one frame, the lost frame count expected value calculation unit 120 calculates the number of frames in which an audio packet loss of one time influences quality. The average influence time determination unit 121 determines an average influence time by multiplying the number of frames by the frame length.

First, the average influence time calculation unit 12 divides the average audio burst length $B_a$ by the average audio packet count $P_n$, calculating an expected value $N_f$ of the number of frames influenced by an audio packet loss of one time (step S700). Then, the average influence time calculation unit 12 determines whether the frame count $N_f$ is smaller than 1 (step S701).

If $N_f \geq 1$, the average influence time calculation unit 12 determines that an audio packet loss of one time influences $N_f$ frames (step S702). The average influence time calculation unit 12 sets, as the average influence time t of a loss of one time, a value obtained by multiplying the frame count $N_f$ by a known frame length F (step S703).

If $N_f<1$ in step S701, the average influence time calculation unit 12 determines that an audio packet loss of one time influences one frame (step S704), and sets the average influence time t=F (step S705). Since an audio packet loss of one time always influences one or more frames, the frame count $N_f$ is always set to 1 or more in the processes of steps S704 and 705:

$$N_f = \max(B_a/P_n, 1) \quad (6)$$

Then, the processing by the average influence time calculation unit 12 ends.

An encoded audio quality value Ie representing the subjective quality of audio data corresponding to an audio bit rate and sampling rate is accumulated in advance in an encoded audio quality value database 20 in the quality estimation unit 2. The encoded audio quality value Ie is derived in advance by a subjective quality assessment experiment, and set in the encoded audio quality value database 20.

More specifically, audio data is encoded using a codec used in a streaming multimedia telecommunication service to be assessed. The audio data is decoded and reproduced. A subject assesses the reproduced speech and determines the encoded audio quality value Ie. This subjective quality assessment experiment is conducted for audio data with various audio bit rates and sampling rates. In this example, DMOS (Difference Mean Opinion Score) is used as the encoded audio quality value Ie, but the encoded audio quality value Ie is not limited to this. The length of audio data used in this subjective quality assessment experiment is set equal to T. The numbers of subjects and data are desirably large.

The encoded audio quality value database 20 outputs, to a subjective quality assessment value estimation unit 22, an encoded audio quality value Ie corresponding to the value of an audio bit rate A input from the audio bit rate calculation unit 10, and a known sampling rate of audio data to be assessed (step S8 in FIG. 8). If the value of the input audio bit rate A does not exist in the database, the encoded audio quality value database 20 outputs, to the subjective quality assessment value estimation unit 22, an encoded audio quality value Ie corresponding to an audio bit rate closest to the value A out of audio bit rates accumulated in the database.

Figure 18:
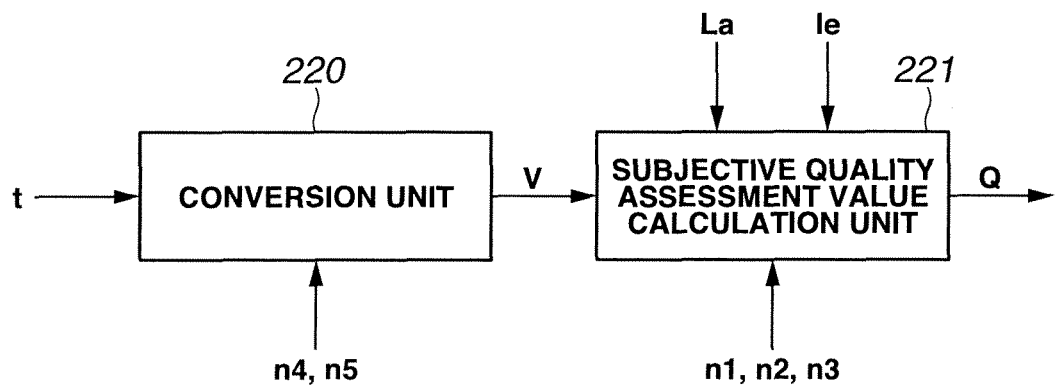
FIG. 18 is a block diagram exemplifying the arrangement of a subjective quality assessment value estimation unit in the first embodiment of the present invention.
Figure 19:
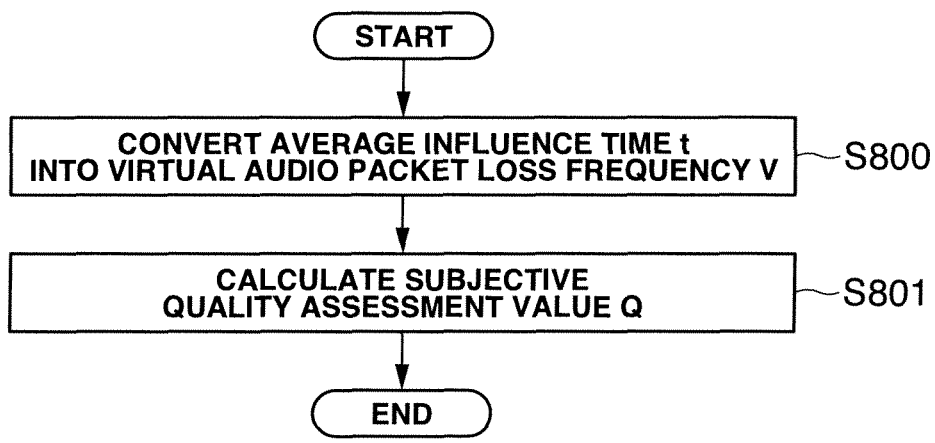
FIG. 19 is a flowchart showing a subjective quality assessment value estimation method by the subjective quality assessment value estimation unit in the first embodiment of the present invention.

FIG. 18 is a block diagram exemplifying the arrangement of the subjective quality assessment value estimation unit 22. FIG. 19 is a flowchart showing a subjective quality assessment value estimation method by the subjective quality assessment value estimation unit 22.

The subjective quality assessment value estimation unit 22 includes a conversion unit 220 and subjective quality assessment value calculation unit 221. The conversion unit 220 converts the average influence time t calculated by the average influence time calculation unit 12 into a virtual audio packet loss frequency, where an audio packet loss of one time for an average influence time t has similar influences on quality to a virtual audio packet loss frequency for a reference influence time set in advance. The subjective quality assessment value calculation unit 221 calculates a subjective quality assessment value based on the encoded audio quality value Ie, audio packet loss frequency $L_a$, and virtual audio packet loss frequency.

The subjective quality assessment value estimation unit 22 calculates a subjective quality assessment value Q based on the encoded audio quality value Ie input from the encoded audio quality value database 20, the audio packet loss frequency $L_a$ input from the audio packet loss frequency calculation unit 11, and the average influence time t input from the average influence time calculation unit 12 (step S10 in FIG. 8):

$$Q=(Ie-1)((1-n_1)e^{(-L_aV/n2)}+n_1e^{(-L_av/n3)}) \quad (7)$$

$$V=(t/n_4)^{n5} \quad (8)$$

where V is the virtual audio packet loss frequency in the average influence time t. The conversion unit 220 calculates the virtual audio packet loss frequency V in accordance with equation (8) (S800). The subjective quality assessment value calculation unit 221 calculates the subjective quality assessment value Q in accordance with equation (7) (step S801). Equation (7) corresponds to the relation fa, and equation (8) corresponds to the relation fb. However, equations (7) and (8) are merely examples, and the present invention is not limited to them. To calculate the subjective quality assessment value Q using equations (7) and (8), the coefficients $n_1$, $n_2$, and $n_3$ in equation (7) and the coefficients $n_4$ and $n_5$ in equation (8) need to be acquired in advance from the coefficient database 21.

The coefficients $n_1$, $n_2$, $n_3$, $n_4$, and $n_5$ for each codec are accumulated in advance in the coefficient database 21. The coefficient database 21 outputs, to the subjective quality assessment value estimation unit 22, the coefficients $n_1$, $n_2$, $n_3$, $n_4$, and $n_5$ corresponding to a known codec used in a streaming multimedia telecommunication service to be assessed (step S9 in FIG. 8). Each coefficient is derived as follows.

First, the user of the audio quality estimation apparatus sets a reference value t' of the average influence time, and creates audio data having the reference influence time t'. This audio data is reproduced, and a subject assesses the reproduced speech and determines the subjective quality assessment value Q. This subjective quality assessment experiment is conducted for audio data with various audio packet loss frequencies, obtaining the subjective quality assessment value Q for each audio packet loss frequency. Further, a similar subjective quality assessment experiment is conducted for loss-free audio data having the reference influence time t', determining an encoded audio quality value Ie. The user sets a virtual audio packet loss frequency of 1 (V=1), and derives, by nonlinear least squares fitting, coefficients $n_1$, $n_2$, and $n_3$ which minimize the error between the subjective quality assessment value Q and the encoded audio quality value Ie for each audio packet loss frequency in equation (7).

Then, the user creates audio data having an average influence time t" other than the reference influence time t' and an audio packet loss frequency of 1. This audio data is reproduced, and the subject assesses the reproduced speech and determines the subjective quality assessment value Q. By using equation (7), the user calculates a loss frequency V when the subjective quality assessment value Q is obtained, and sets the calculated value as a virtual audio packet loss frequency V" in the average influence time t". This subjective quality assessment experiment is conducted for audio data with various average influence times t". The user derives, by nonlinear least squares fitting, coefficients $n_4$ and $n_5$ which minimize the error between the virtual audio packet loss frequency V" for each average influence time t" and the virtual audio packet loss frequency V obtained when the average influence time t" is substituted into equation (8). In this fashion, the coefficients $n_1$, $n_2$, $n_3$, $n_4$, and $n_5$ can be derived.

In the subjective quality assessment experiment for deriving the coefficients $n_1$, $n_2$, $n_3$, $n_4$, and $n_5$, the audio data, encoded audio quality value Ie, Q, and subject used are desirably the same as those used when creating the encoded audio quality value database 20.

According to the first embodiment described above, the subjective quality can be estimated in service using only information on the receiving side. In the first embodiment, packet losses are divided by the frequency and the magnitude of influence of one loss. Further, the influence of one loss is estimated from the time length. As a result, subjective quality estimation corresponding to any packet loss pattern can be implemented.

[Second Embodiment]

Figure 20:
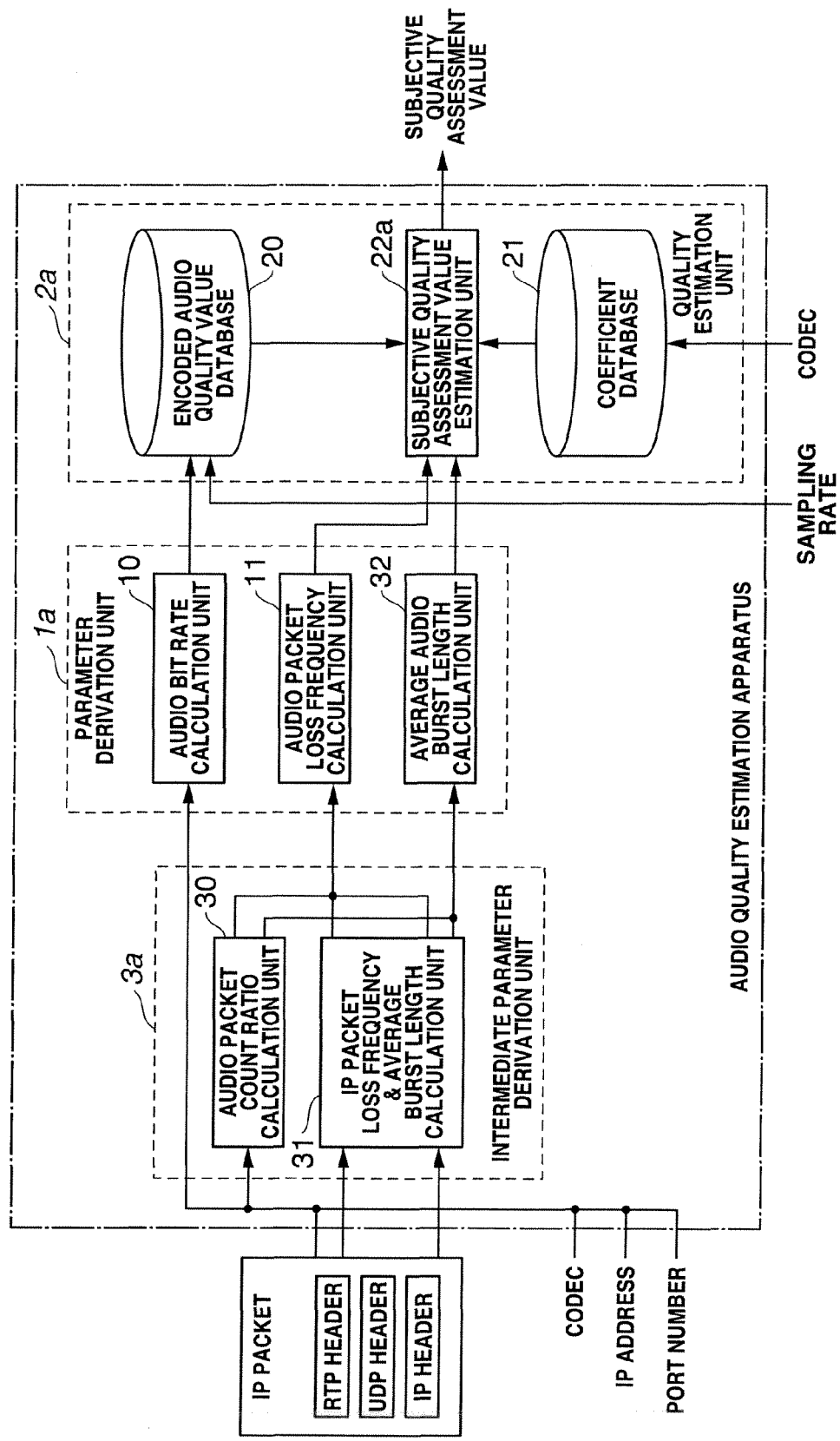
FIG. 20 is a block diagram showing the arrangement of an audio quality estimation apparatus according to the second embodiment of the present invention.

The second embodiment of the present invention will be described. FIG. 20 is a block diagram showing the arrangement of an audio quality estimation apparatus according to the second embodiment of the present invention. The same reference numerals as those in FIGS. 1 and 7 denote the same parts.

The audio quality estimation apparatus includes a parameter derivation unit 1a, quality estimation unit 2a, and intermediate parameter derivation unit 3a.

The parameter derivation unit 1a includes an audio bit rate calculation unit 10, audio packet loss frequency calculation unit 11, and average audio burst length calculation unit 32.

The intermediate parameter derivation unit 3a includes an audio packet count ratio calculation unit 30 and IP packet loss frequency & average burst length calculation unit 31.

The quality estimation unit 2a includes an encoded audio quality value database 20, coefficient database 21, and subjective quality assessment value estimation unit 22a.

In the second embodiment, the average audio burst length calculation unit 32 replaces the average influence time calculation unit 12 in the first embodiment, and calculates a subjective quality assessment value based on an audio packet loss frequency $L_a$ and average audio burst length $B_a$.

Figure 21:
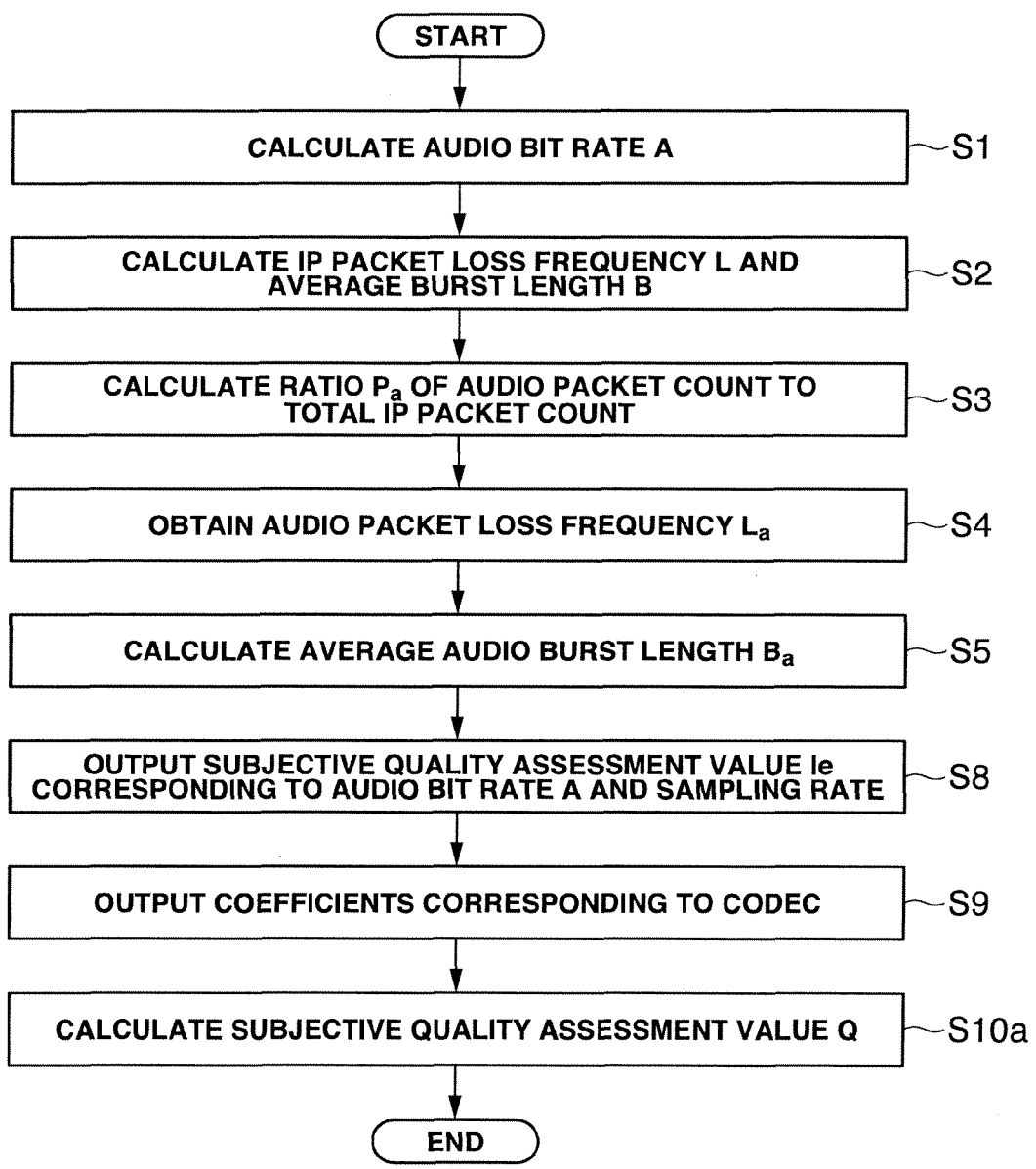
FIG. 21 is a flowchart showing the operation of the audio quality estimation apparatus according to the second embodiment of the present invention.

The operation of the audio quality estimation apparatus according to the second embodiment will be explained with reference to FIG. 21. Processes in steps S1 to S5, S8, and S9 are the same as those in the first embodiment, and a description thereof will not be repeated.

Figure 22:
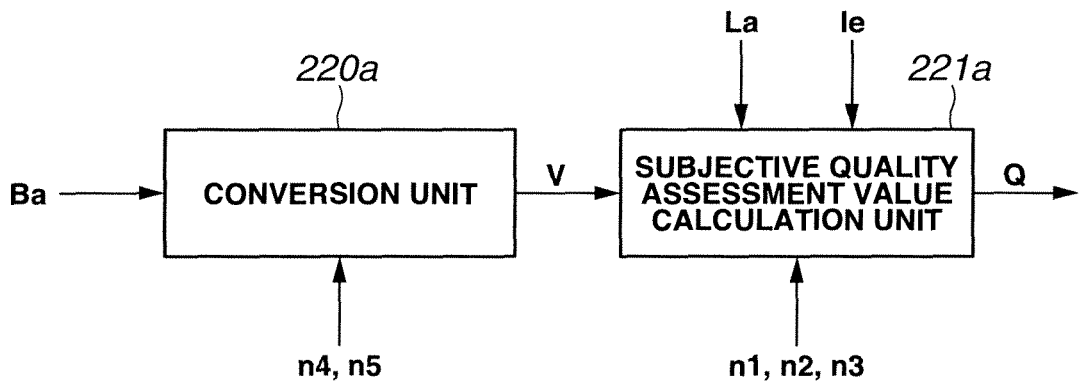
FIG. 22 is a block diagram exemplifying the arrangement of a subjective quality assessment value estimation unit in the second embodiment of the present invention.
Figure 23:
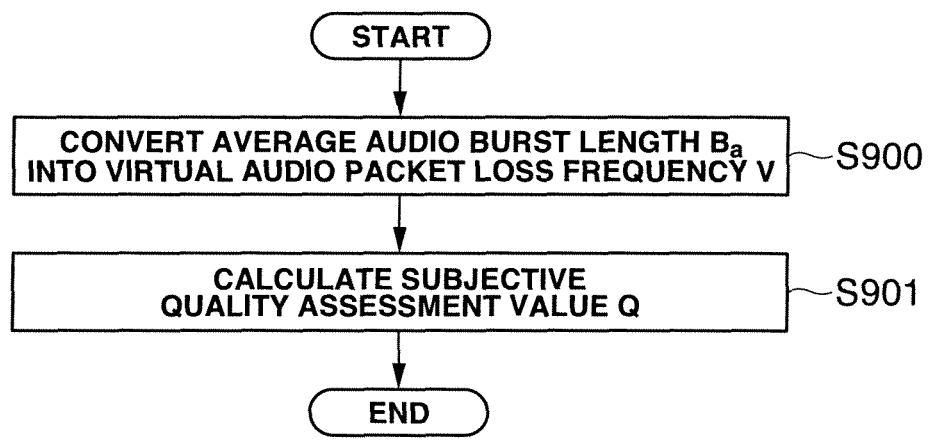
FIG. 23 is a flowchart showing a subjective quality assessment value estimation method by the subjective quality assessment value estimation unit in the second embodiment of the present invention.

FIG. 22 is a block diagram exemplifying the arrangement of the subjective quality assessment value estimation unit 22a. FIG. 23 is a flowchart showing a subjective quality assessment value estimation method by the subjective quality assessment value estimation unit 22a.

The subjective quality assessment value estimation unit 22a includes a conversion unit 220a and subjective quality assessment value calculation unit 221a. The conversion unit 220a converts the average audio burst length $B_a$ calculated by the average audio burst length calculation unit 32 into a virtual audio packet loss frequency V, where an audio packet loss of one time for an average audio burst length $B_a$ has similar influences on quality to a virtual audio packet loss frequency V for a reference audio burst length set in advance. The subjective quality assessment value calculation unit 221a calculates a subjective quality assessment value Q based on the encoded audio quality value Ie, audio packet loss frequency $L_a$, and virtual audio packet loss frequency V.

The subjective quality assessment value estimation unit 22a calculates the subjective quality assessment value Q based on the encoded audio quality value Ie input from the encoded audio quality value database 20, coefficients $n_1$, $n_2$, $n_3$, $n_4$, and $n_5$ input from the coefficient database 21, the audio packet loss frequency $L_a$ input from the audio packet loss frequency calculation unit 11, and the average audio burst length $B_a$ input from the average audio burst length calculation unit 32 (step S10a in FIG. 21):

$$Q=(Ie-1)((1-n)e^{(-L_aV/n2)}+n_1 e^{(-L_aV/n3)}) \quad (9)$$

$$V=(B_a/n_4)^{n5} \quad (10)$$

The conversion unit 220a calculates the virtual audio packet loss frequency V in accordance with equation (10) (S900). The subjective quality assessment value calculation unit 221a calculates the subjective quality assessment value Q in accordance with equation (9) (step S901). Note that all the explanation of the average influence time in the principle and the first embodiment is applicable to the second embodiment. That is, it suffices to replace the average influence time described in the principle and the first embodiment with the average audio burst length, and the reference influence time with the reference audio burst length.

Even the second embodiment can obtain the same effects as those in the first embodiment.

Note that the audio quality estimation apparatus in each of the first and second embodiments can be implemented by a computer having a CPU, storage device, and external interface, and a program which controls these hardware resources. An audio quality estimation program for causing the computer to implement the audio quality estimation method of the present invention is provided in a state in which it is recorded on a recording medium such as a flexible disk, CD-ROM, DVD-ROM, or memory card. The CPU writes the program loaded from the recording medium in the storage device, and executes processing as described in the first or second embodiment in accordance with the program.

The first and second embodiments have described the audio quality estimation apparatus as one apparatus, but the present invention is not limited to this. For example, parameter derivation units 1 and 1a, and intermediate parameter derivation units 3 and 3a may be arranged in a receiving terminal, and quality estimation units 2 and 2a may be arranged in the control center of multimedia telecommunication services. In this case, parameters calculated in the receiving terminal are sent to the quality estimation units 2 and 2a in the control center.

INDUSTRIAL APPLICABILITY

The present invention is applicable to a technique of estimating the subjective quality of audio data experienced by a user in multimedia telecommunication services.

The invention claimed is:

1. An audio quality estimation method for a multimedia telecommunication service which transmits a mixture of an audio packet serving as an IP packet containing audio data, and an IP packet containing no audio data, comprising:
    an audio packet loss frequency calculation step of, when at least one audio packet to be assessed exists in singly or continuously generated IP packet losses, calculating an audio packet loss frequency based on information of received IP packets by counting the packet losses as an audio packet loss of one time regardless of a continuous length;
    an average influence time calculation step of calculating, based on information of received IP packets, an average influence time serving as an average time during which audio quality is influenced by an audio packet loss of one time obtained by said counting; and
    an subjective quality assessment value estimation step of estimating a subjective quality assessment value based on an encoded audio quality value representing subjective quality of audio whose quality has degraded upon encoding by a codec obtained with an audio bit rate calculated based on information on received IP packets, the audio packet loss frequency and the average influence time.

2. An audio quality estimation method according to claim 1, further comprising:
    an IP packet loss frequency calculation step of calculating an IP packet loss frequency based on information of received IP packets by counting singly or continuously generated IP packet losses as an IP packet loss of one time regardless of a continuous length;
    an average burst length calculation step of calculating, based on information of received IP packets, an average burst length serving as an average number of IP packets contained in an IP packet loss of one time detected in the IP packet loss frequency calculation step;
    an audio packet count ratio calculation step of calculating a ratio of an audio packet count o a total IP packet count based on information of received IP packets;
    an average audio burst length calculation step of calculating, based on the average burst length and the ratio of the audio packet count to the total IP packet count, an average audio burst length serving as an average number of audio packets contained in an audio packet loss of one time detected in the audio packet loss frequency calculation step; and
    an average audio packet count calculation step of calculating, based on information of received IP packets, an average number of audio packets which store audio data of one frame,
    wherein in the audio packet loss frequency calculation step, the audio packet loss frequency is calculated based on the IP packet loss frequency, the average burst length, and the ratio of the audio packet count to the total IP packet count, and
    in the average influence time calculation step, the average influence time is calculated based on a frame length, the average audio burst length, and the average number of audio packets which store audio data of one frame.

3. An audio quality estimation t method according to claim 2, wherein he audio packet loss frequency calculation step includes
- an audio packet count expected value calculation step of calculating an expected value of the number of audio packets lost by an IP packet loss of one time by multiplying the average burst length and the ratio of the audio packet count to the total IP packet count, and
- an audio packet loss frequency determination step of determining the audio packet loss frequency from the expected value of the number of audio packets and the IP packet loss frequency.

4. An audio quality estimation method according to claim 2, wherein the average influence time calculation step includes
- a frame count calculation step of calculating, based on the average audio burst length and the average number of audio packets which store audio data of one frame, the number of frames in which an audio packet loss of one time influences quality, and
- an average influence time determination step of determining the average influence time by multiplying the number of frames by the frame length.

5. An audio quality estimation method according to claim 2, further comprising the audio bit rate calculation step of calculating an audio bit rate based on information of received IP packets,
- wherein in the subjective quality assessment value estimation step, the encoded audio quality value corresponding to the audio bit rate and a sampling rate of the codec to be assessed is received from an encoded audio quality value database which stores in advance the encoded audio quality value representing subjective quality of audio data whose quality has degraded upon encoding by the codec, and the subjective quality assessment value is calculated based on the encoded audio quality value, the audio packet loss frequency, and the average influence time.

6. An audio quality estimation method according to claim 5, wherein the subjective quality assessment value estimation step includes
- a conversion step of converting the average influence time calculated in the average influence time calculation step into a virtual audio packet loss frequency, where an audio packet loss of one time for the average influence time has similar influences on quality to a virtual audio packet loss frequency for a reference influence time set in advance, and
- a subjective quality assessment value calculation step of calculating the subjective quality assessment value based on the encoded audio quality value, the audio packet loss frequency, and the virtual audio packet loss frequency.

7. An audio quality estimation method according to claim 6, wherein
- in the subjective quality assessment value calculation step, the subjective quality assessment value is calculated based on a predetermined relationship between the encoded audio quality value, the audio packet loss frequency, the virtual audio packet loss frequency, and the subjective quality assessment value, and
- the relationship between the encoded audio quality value, the audio packet loss frequency, the virtual audio packet loss frequency, and the subjective quality assessment value is derived by performing a subjective quality assessment experiment which determines a subjective quality assessment value corresponding to the length of the reference influence time for each audio packet loss frequency.

8. An audio quality estimation method according to claim 7, wherein
- in the conversion step, the average influence time is converted into the virtual audio packet loss frequency based on a predetermined relationship between the average influence time and the virtual audio packet loss frequency, and
- the relationship between the average influence time and the virtual audio packet loss frequency is derived by performing, for a plurality of influence times, processing of determining, by a subjective quality assessment experiment, a subjective quality assessment value when an audio packet loss frequency in a specific influence time is obtained by said audio packet loss frequency calculation step by an audio packet loss of one time obtained by said counting, calculating, from a relationship between the encoded audio quality value, the audio packet loss frequency, and the subjective quality assessment value, an audio packet loss frequency for a reference influence time which gives quality equivalent to the subjective quality assessment value, and setting the calculated audio packet loss frequency as a virtual audio packet loss frequency in the influence time.

9. An audio quality estimation method according to claim 5, wherein in the audio packet count ratio calculation step, the average audio packet count calculation step, and the audio bit ate calculation step, only an audio packet to be assessed is extracted based on information of an IP address, port number, and payload type in an IP packet header.

10. An audio quality estimation method according to claim 2, wherein in the average audio packet count calculation step, the average number of audio packets which store audio data of one frame is calculated based on a protocol structure in a received IP packet.

11. An audio quality estimation apparatus for a multimedia telecommunication service which transmits a mixture of an audio packet serving as an IP packet containing audio data, and an IP packet containing no audio data, comprising:
- audio packet loss frequency calculation means for, when at least one audio packet to be assessed exists in singly or continuously generated IP packet losses, calculating an audio packet loss frequency based on information of received IP packets by counting the packet losses as an audio packet loss of one time regardless of a continuous length;
- average influence time calculation means for calculating, based on information of received IP packets, an average influence time serving as an average time during which audio quality is influenced by an audio packet loss of one time obtained by said counting; and
- subjective quality assessment value estimation means for estimating a subjective quality assessment value based on an encoded audio quality value representing subjective quality of audio whose quality has degraded upon encoding by a codec obtained with an audio bit rate calculated based on information on received IP packets, the audio packet loss frequency and the average influence time.

12. An audio quality estimation apparatus according to claim 11, further comprising:
- IP packet loss frequency calculation means for calculating an IP packet loss frequency based on information of received IP packets by counting singly or continuously generated IP packet losses as an IP packet loss of one time regardless of a continuous length;

average burst length calculation means for calculating, based on information of received IP packets, an average burst length serving as an average number of IP packets contained in an IP packet loss of one time detected by said IP packet loss frequency calculation means;

audio packet count ratio calculation means for calculating a ratio of an audio packet count to a total IP packet count based on information of received IP packets;

average audio burst length calculation means for calculating, based on the average burst length and the ratio of the audio packet count to the total IP packet count, an average audio burst length serving as an average number of audio packets contained in an audio packet loss of one time detected by said audio packet loss frequency calculation means; and average audio packet count calculation means for calculating, based on information of received IP packets, an average number of audio packets which store audio data of one frame, wherein said audio packet loss frequency calculation means calculates the audio packet loss frequency based on the IP packet loss frequency, the average burst length, and the ratio of the audio packet count to the total IP packet count, and said average influence time calculation means calculates the average influence time based on a frame length, the average audio burst length, and the average number of audio packets which store audio data of one frame.

13. An audio quality estimation apparatus according to claim 12, wherein said audio packet loss frequency calculation means includes audio packet count expected value calculation means for calculation an expected value of the number of audio packets lost by an IP packet loss of one time by multiplying the average burst length and the ratio of the audio packet count to the total IP packet count, and audio packet loss frequency determination means for determining the audio packet loss frequency from the expected value of the number of audio packets and the IP packet loss frequency.

14. An audio quality estimation apparatus according to claim 12, wherein said average influence time calculation means includes frame count calculation means for calculating, based on the average audio burst length and the average number of audio packets which store audio data of one frame, the number of frames in which an audio packet loss of one time influences quality, and average influence time determination means for determining the average influence time by multiplying the number of frames by the frame length.

15. An audio quality estimation apparatus according to claim 12, further comprising audio bit rate calculation means for calculating the audio bit rate based on information of received IP packets, wherein said subjective quality assessment value estimation means receives the encoded audio quality value corresponding to the audio bit rate and a sampling rate of the codec to be assessed, from an encoded audio quality value database which stores in advance the encoded audio quality value representing subjective quality of audio data whose quality has degraded upon encoding by the codec, and calculates the subjective quality assessment value based on the encoded audio quality value, the audio packet loss frequency, and the average influence time.

16. An audio quality estimation apparatus according to claim 15, wherein said subjective quality assessment value estimation means includes conversion means for converting the average influence time calculated by said average influence time calculation means into a virtual audio packet loss frequency, where an audio packet loss of one time for the average influence time has similar influences on quality to a virtual audio packet loss frequency for a reference influence time set in advance, and subjective quality assessment value calculation means for calculating the subjective quality assessment value based on the encoded audio quality value, the audio packet loss frequency, and the virtual audio packet loss frequency.

17. An audio quality estimation apparatus according to claim 16, wherein said subjective quality assessment value calculation means calculates the subjective quality assessment value based on a predetermined relationship between the encoded audio quality value, the audio packet loss frequency, the virtual audio packet loss frequency, and the subjective quality assessment value, and the relationship between the encoded audio quality value, the audio packet loss frequency, the virtual audio packet loss frequency, and the subjective quality assessment value is derived by performing a subjective quality assessment experiment which determines a subjective quality assessment value corresponding to the length of the reference influence time for each audio packet loss frequency.

18. An audio quality estimation apparatus according to claim 17, wherein said conversion means converts the average influence time into the virtual audio packet loss frequency based on a predetermined relationship between the average influence time and the virtual audio packet loss frequency, and the relationship between the average influence time and the virtual audio packet loss frequency is derived by performing, for a plurality of influence times, processing of determining, by a subjective quality assessment experiment, a subjective quality assessment value when an audio packet loss frequency in a specific influence time is obtained by said audio packet loss frequency calculation means and by an audio packet loss of one time obtained by said counting, calculating, from a relationship between the encoded audio quality value, the audio packet loss frequency, and the subjective quality assessment value, an audio packet loss frequency for a reference influence time which gives quality equivalent to the subjective quality assessment value, and setting the calculated audio packet loss frequency as a virtual audio packet loss frequency in the influence time.

19. An audio quality estimation apparatus according to claim 15, wherein said audio packet count ratio calculation means, said average audio packet count calculation means, and said audio bit rate calculation means extract only an audio packet to be assessed, based on information of an IP address, port number, and payload type in an IP packet header.

20. An audio quality estimation apparatus according to claim 12, wherein said average audio packet count calculation means calculates, based on a protocol structure in a received IP packet, the average number of audio packets which store audio data of one frame.

21. An audio quality estimation method for a multimedia telecommunication service which transmits a mixture of an audio packet serving as an IP packet containing audio data, and an IP packet containing no audio data, comprising:
an audio packet loss frequency calculation step of, when at least one audio packet to be assessed exists in singly or continuously generated IP packet losses, calculating an audio packet loss frequency based on information of received IP packets by counting the packet losses as an audio packet loss of one time regardless of a continuous length;
an average audio burst length calculation step of calculating, based on information of received IP packets, an average audio burst length serving as an average number of audio packets contained in an audio packet loss of one time; and
a subjective quality assessment value estimation step of estimating a subjective quality assessment value based on an encoded audio quality representing subjective quality of audio whose quality has degraded upon encoding by a codec obtained with an audio bit rate calculated based on information on received IP packets, the encoded audio value, the audio packet loss frequency and the average audio burst length.

22. An audio quality estimation method according to claim 21, further comprising:
an IP packet loss frequency calculation step of calculating an IP packet loss frequency based on information of received IP packets by counting singly or continuously generated IP packet losses as an IP packet loss of one time regardless of a continuous length;
an average burst length calculation step of calculating, based on information of received IP packets, an average burst length serving as an average number of IP packets contained in an IP packet loss of one time detected in the IP packet loss frequency calculation step; and
an audio packet count ratio calculation step of calculating a ratio of an audio packet count to a total IP packet count based on information of received IP packets,
wherein in the audio packet loss frequency calculation step, the audio packet loss frequency is calculated based on the IP packet loss frequency, the average burst length, and the ratio of the audio packet count to the total IP packet count, and
in the average audio burst length calculation step, the average audio burst length serving as the average number of audio packets contained in an audio packet loss of one time detected in the audio packet loss frequency calculation step is calculated based on the average burst length and the ratio of the audio packet count to the total IP packet count.

23. An audio quality estimation method according to claim 22, wherein the audio packet loss frequency calculation step includes
an audio packet count expected value calculation step of calculating an expected value of the number of audio packets lost by an IP packet loss of one time by multiplying the average burst length and the ratio of the audio packet count to the total IP packet count, and
an audio packet loss frequency determination step of determining the audio packet loss frequency from the expected value of the number of audio packets and the IP packet loss frequency.

24. An audio quality estimation method according to claim 22, further comprising an audio bit rate calculation step of calculating the audio bit rate based on information of received IP packets,
wherein in the subjective quality assessment value estimation step, the encoded audio quality value corresponding to the audio bit rate and a sampling rate of the codec to be assessed is received from an encoded audio quality value database which stores in advance the encoded audio quality value representing subjective quality of audio data whose quality has degraded upon encoding by the codec, and the subjective quality assessment value is calculated based on the encoded audio quality value, the audio packet loss frequency, and the average audio burst length.

25. An audio quality estimation method according to claim 24, wherein the subjective quality assessment value estimation step includes
a conversion step of converting the average audio burst length calculated in the average audio burst length calculation step into a virtual audio packet loss frequency, where an audio packet loss of one time for the average audio burst length has similar influences on quality to a virtual audio packet loss frequency for a reference audio burst length set in advance, and
a subjective quality assessment value calculation step of calculating the subjective qualify assessment value based on the encoded audio quality value the audio packet loss frequency, and the virtual audio packet loss frequency.

26. An audio quality estimation method according to claim 25, wherein
in the subjective quality assessment value calculation step, the subjective quality assessment value is calculated based on a predetermined relationship between the encoded audio quality value, the audio packet loss frequency, the virtual audio packet loss frequency, and the subjective quality assessment value, and
the relationship between the encoded audio quality value, the audio packet loss frequency, the virtual audio packet loss frequency, and the subjective quality assessment value is derived by performing a subjective quality assessment experiment which determines a subjective quality assessment value corresponding to the reference audio burst length for each audio packet loss frequency.

27. An audio quality estimation method according to claim 26, wherein
in the conversion step, the average audio burst length is converted into the virtual audio packet loss frequency based on a predetermined relationship between the average audio burst length and the virtual audio packet loss frequency, and
the relationship between the average audio burst length and the virtual audio packet loss frequency is derived by performing, for a plurality of audio burst lengths, processing of determining, by a subjective quality assessment experiment, a subjective quality assessment value when an audio packet loss frequency for a specific audio burst length is obtained by said audio packet loss frequency calculation step and by an audio packet loss of one time obtained by said counting, calculating, from a relationship between the encoded audio quality value, the audio packet loss frequency, and the subjective quality assessment value, an audio packet loss frequency for a reference audio burst length which gives quality equivalent to the subjective quality assessment value, and setting the calculated audio packet loss frequency as a virtual audio packet loss frequency for the audio burst length.

28. An audio quality estimation method according to claim 24, wherein in the audio packet count ratio calculation step and the audio bit rate calculation step, only an audio packet to be assessed is extracted based on information of an IP address, port number and payload type in an IP packet header.

29. An audio quality estimation apparatus for a multimedia telecommunication service which transmits a mixture of an audio packet serving as an IP packet containing audio data, and an IP packet containing no audio data, comprising:
audio packet loss frequency calculation means for, when at least one audio packet to be assessed exists in singly or continuously generated IP packet losses, calculating an audio packet loss frequency based on information of received IP packets by counting the packet losses as an audio packet loss of one time regardless of a continuous length;
average audio burst length calculation means for calculating, based on information of received IP packets, an average audio burst length serving as an average number of audio packets contained in an audio packet loss of one time; and
subjective quality assessment value estimation means for estimating a subjective quality assessment value based on an encoded audio quality value representing subjective quality of audio whose quality has degraded upon encoding by a codec obtained with an audio bit rate calculated based on information on received IP packets, the audio packet loss frequency and the average audio burst length.

30. An audio quality estimation apparatus according to claim 29, further comprising:
IP packet loss frequency calculation means for calculating an IP packet loss frequency based on information of received IP packets by counting singly or continuously generated IP packet losses as an IP packet loss of one time regardless of a continuous length;
average burst length calculation means for calculating, based on information of received IP packets, an average burst length serving as an average number of IP packets contained in an IP packet loss of one time detected by said IP packet loss frequency calculation means; and
audio packet count ratio calculation means for calculating a ratio of an audio packet count to a total IP packet count based on information of received IP packets,
wherein said audio packet loss frequency calculation means calculates the audio packet loss frequency based on the IP packet loss frequency, the average burst length, and the ratio of the audio packet count to the total IP packet count, and
said average audio burst length calculation means calculates, based on the average burst length and the ratio of the audio packet count to the total IP packet count, the average audio burst length serving as the average number of audio packets contained in an audio packet loss of one time detected by said audio packet loss frequency calculation means.

31. An audio quality estimation apparatus according to claim 30, wherein said audio packet loss frequency calculation means includes
audio packet count expected value calculation means for calculating an expected value of the number of audio packets lost by an IP packet loss of one time by multiplying the average burst length and the ratio of the audio packet count to the total IP packet count, and audio packet loss frequency determination means for determining the audio packet loss frequency from the expected value of the number of audio packets and the IP packet loss frequency.

32. An audio quality estimation apparatus according to claim 30, further comprising audio bit rate calculation means for calculating the audio bit ate based on information of received IP packets,
wherein said subjective quality assessment value estimation means receives the encoded audio quality value corresponding to the audio bit rate and a sampling rate of the codec to be assessed, from an encoded audio quality value database which stores in advance the encoded audio quality value representing subjective quality of audio data whose quality has degraded upon encoding by the codec, and calculates the subjective quality assessment value based on the encoded audio quality value, the audio packet loss frequency, and the average audio burst length.

33. An audio quality estimation apparatus according to claim 32, wherein said subjective quality assessment value estimation means includes
conversion means for converting the average audio burst length calculated by said average audio burst length calculation means into a virtual audio packet loss frequency, where an audio packet loss of one time for the average audio burst length has similar influences on quality to a virtual audio packet loss frequency for a reference audio burst length set in advance, and
subjective quality assessment value calculation means for calculating the subjective quality assessment value based on the encoded audio quality value, the audio packet loss frequency, and the virtual audio packet loss frequency.

34. An audio quality estimation apparatus according to claim 33, wherein
said subjective quality assessment value calculation means calculates the subjective quality assessment value based on a predetermined relationship between the encoded audio quality value, the audio packet loss frequency, the virtual audio packet loss frequency, and the subjective quality assessment value, and
the relationship between the encoded audio quality value, the audio packet loss frequency, the virtual audio packet loss frequency, and the subjective quality assessment value is derived by performing a subjective quality assessment experiment which determines a subjective quality assessment value corresponding to the reference audio burst length for each audio packet loss frequency.

35. An audio quality estimation apparatus according to claim 34, wherein
said conversion means converts the average audio burst length into the virtual audio packet loss frequency based on a predetermined relationship between the average audio burst length and the virtual audio packet loss frequency, and
the relationship between the average audio burst length and the virtual audio packet loss frequency is derived by performing, for a plurality of audio burst lengths, processing of determining, by a subjective quality assessment experiment, a subjective quality assessment value when an audio packet loss frequency for a specific audio burst length is obtained by said audio packet loss frequency calculation means and by an audio packet loss of one time obtained by said counting, calculating, from a relationship between the encoded audio quality value, the audio packet loss frequency, and the subjective quality assessment value, an audio packet loss frequency for a reference audio burst length which gives quality equivalent to the subjective quality assessment value, and setting the calculated audio packet loss frequency as a virtual audio packet loss frequency for the audio burst length.

36. An audio quality estimation apparatus according to claim 32, wherein said audio packet count ratio calculation means and said audio bit rate calculation means extract only an audio packet to be assessed, based on information of an IP address, port number, and payload type in an IP packet header.

* * * * *

UNITED STATES PATENT AND TRADEMARK OFFICE
CERTIFICATE OF CORRECTION

PATENT NO. : 8,868,222 B2
APPLICATION NO. : 12/996767
DATED : October 21, 2014
INVENTOR(S) : Noritsugu Egi and Takanori Hayashi It is certified that error appears in the above-identified patent and that said Letters Patent is hereby corrected as shown below:

In the Claims,

Column 16, Claim 2, line 46, please delete "count o a" and insert --count to a--.

Column 17, Claim 3, line 1, please delete "t method" and insert --method--.

Column 17, Claim 3, line 2, please delete "wherein he" and insert --wherein the--.

Column 18, Claim 8, line 19, please delete "step by" and insert --step and by--.

Column 18, Claim 9, line 31, please delete "ate" and insert --rate--.

Column 19, Claim 13, line 19, please delete "calculation" and insert --calculating--.

Column 22, Claim 24, line 28, please delete "qualify" and insert --quality--.

Column 22, Claim 24, line 29, please delete "value" and insert --value,--.

Column 24, Claim 32, line 7, please delete "ate" and insert --rate--.

Signed and Sealed this
Fifth Day of May, 2015

Michelle K. Lee
*Director of the United States Patent and Trademark Office*